(12) United States Patent
Kang et al.

(10) Patent No.: US 10,228,903 B2
(45) Date of Patent: Mar. 12, 2019

(54) METHOD AND DEVICE FOR COMMUNICATION

(71) Applicant: Samsung Electronics Co., Ltd., Gyeonggi-do (KR)

(72) Inventors: Hyuk Kang, Gyeonggi-do (KR); Kyung-tae Kim, Gyeonggi-do (KR); Seong-min Je, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 712 days.

(21) Appl. No.: 14/320,907

(22) Filed: Jul. 1, 2014

(65) Prior Publication Data

US 2015/0026580 A1    Jan. 22, 2015

(30) Foreign Application Priority Data

Jul. 19, 2013 (KR) .................. 10-2013-0085685

(51) Int. Cl.
| | |
|---|---|
| *G06F 3/048* | (2013.01) |
| *G06F 3/16* | (2006.01) |
| *H04W 12/04* | (2009.01) |
| *H04W 76/14* | (2018.01) |
| *G10L 15/22* | (2006.01) |

(Continued)

(52) U.S. Cl.
CPC ............ *G06F 3/167* (2013.01); *H04W 12/04* (2013.01); *H04W 76/14* (2018.02); *G10L 15/00* (2013.01); *G10L 17/00* (2013.01); *G10L 2015/223* (2013.01)

(58) Field of Classification Search
CPC ......................... H04W 12/04; H04W 76/026
USPC ........................................................ 715/728
See application file for complete search history.

(56) References Cited

U.S. PATENT DOCUMENTS

| | | | | |
|---|---|---|---|---|
| 6,233,324 | B1 * | 5/2001 | Sebestyen | H04L 29/06 358/434 |
| 6,594,630 | B1 * | 7/2003 | Zlokarnik | G10L 15/26 704/241 |

(Continued)

FOREIGN PATENT DOCUMENTS

| | | |
|---|---|---|
| CN | 1627689 A | 6/2005 |
| CN | 101795453 A | 8/2010 |

(Continued)

OTHER PUBLICATIONS

Chinese Search Report dated May 3, 2018.

(Continued)

*Primary Examiner* — David Phantana-angkool
(74) *Attorney, Agent, or Firm* — Cha & Reiter, LLC.

(57) ABSTRACT

A system of communicating between first and second electronic devices, comprises, in a first device, receiving from a second device, voice representative information acquired by the second device, and connection information indicating characteristics of communication to be used in establishing a communication link with the second device. The system compares the voice representative information with predetermined reference voice representative information and in response to the comparison, establishes a communication link with the second device by using the connection information received from the second device.

37 Claims, 22 Drawing Sheets

(51) Int. Cl.
*G10L 15/00* (2013.01)
*G10L 17/00* (2013.01)

(56) References Cited

U.S. PATENT DOCUMENTS

| | | | | |
|---|---|---|---|---|
| 8,370,159 | B2* | 2/2013 | Lee | G10L 15/30 370/204 |
| 8,648,692 | B2* | 2/2014 | Himmelstein | G10L 17/22 340/5.1 |
| 8,977,269 | B2* | 3/2015 | Chhabra | H04M 15/7652 455/436 |
| 9,024,998 | B2* | 5/2015 | Chu | H04N 7/142 348/14.02 |
| 9,112,984 | B2* | 8/2015 | Sejnoha | H04M 1/72519 |
| 9,117,449 | B2* | 8/2015 | Newman | G10L 15/22 |
| 9,361,885 | B2* | 6/2016 | Ganong, III | G10L 15/22 |
| 9,374,242 | B2* | 6/2016 | Jung | H04L 51/14 |
| 9,390,708 | B1* | 7/2016 | Hoffmeister | G10L 15/02 |
| 9,513,861 | B2* | 12/2016 | Lin | H04M 3/567 |
| 9,756,549 | B2* | 9/2017 | Perdomo | H04W 40/12 |
| 9,875,081 | B2* | 1/2018 | Meyers | G10L 15/063 |
| 9,881,604 | B2* | 1/2018 | Lee | G10L 15/26 |
| 2005/0010417 | A1 | 1/2005 | Holmes | |
| 2005/0059345 | A1 | 3/2005 | Palin et al. | |
| 2006/0116107 | A1 | 6/2006 | Hulvey | |
| 2007/0028134 | A1 | 2/2007 | Gammel et al. | |
| 2007/0047694 | A1* | 3/2007 | Bouchard | H04M 3/38 379/67.1 |
| 2007/0265009 | A1 | 11/2007 | Hamaguchi | |
| 2008/0003946 | A1* | 1/2008 | Lee | H04W 8/005 455/41.2 |
| 2008/0175197 | A1 | 7/2008 | Shao et al. | |
| 2009/0197534 | A1 | 8/2009 | Stenberg | |
| 2010/0164685 | A1 | 7/2010 | Pering et al. | |
| 2010/0332236 | A1 | 12/2010 | Tan | |
| 2012/0051187 | A1* | 3/2012 | Paulson | H04B 1/06 367/135 |
| 2012/0295541 | A1* | 11/2012 | Kwon | H04W 76/023 455/41.1 |
| 2014/0086209 | A1* | 3/2014 | Su | H04W 76/026 370/331 |
| 2014/0128063 | A1* | 5/2014 | Chhabra | H04M 15/7652 455/435.1 |
| 2015/0113094 | A1* | 4/2015 | Williams | G06F 3/165 709/217 |
| 2016/0095152 | A1* | 3/2016 | McDonnell | H04L 5/001 370/294 |
| 2016/0212742 | A1* | 7/2016 | Zhang | H04W 76/02 |
| 2016/0270141 | A1* | 9/2016 | Sharma | H04W 76/026 |
| 2017/0048773 | A1* | 2/2017 | Miao | H04W 8/183 |
| 2017/0150542 | A1* | 5/2017 | Chhabra | H04W 76/023 |

FOREIGN PATENT DOCUMENTS

| | | |
|---|---|---|
| CN | 102056328 A | 5/2011 |
| CN | 102917470 A | 2/2013 |
| WO | 2013/012401 A1 | 1/2013 |

OTHER PUBLICATIONS

He, et al.; Practical Coursebook on Multimedia Technology (3rd edition); p. 220; Fig. 5-10.
Chinese Search Report dated Nov. 23, 2018.

* cited by examiner

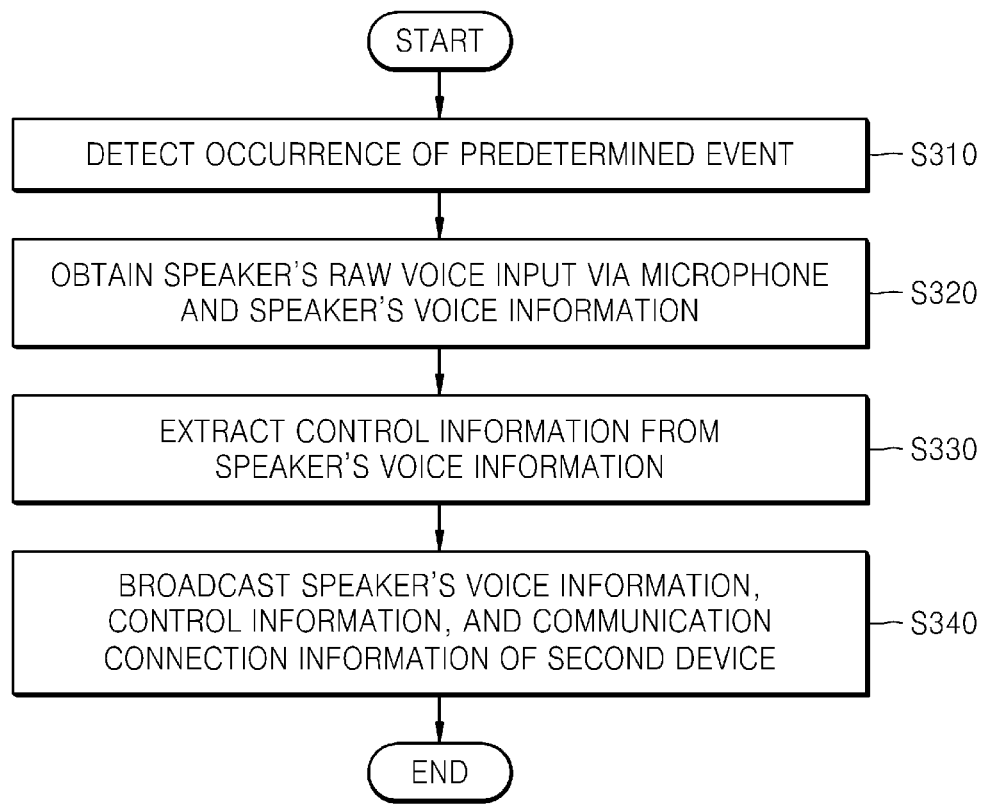

FIG. 4

| Command (410) | OPERATION (420) |
|---|---|
| Receive (this) | CONTENT TRANSMISSION FROM FIRST DEVICE TO SECOND DEVICE (FIRST DEVICE : PREPARE FOR RECEPTION, SECOND DEVICE : PREPARE FOR TRANSMISSION) |
| Send (something) | CONTENT TRANSMISSION FROM FIRST DEVICE TO SECOND DEVICE (FIRST DEVICE : PREPARE FOR TRANSMISSION, SECOND DEVICE : PREPARE FOR RECEPTION) |
| Set (something) | CHANGE SETTING OF FIRST DEVICE EX) MIRRORING, MODE SWITCH, ETC. |
| Pair (this) | AUTHENTICATION OF FIRST DEVICE |
| Sync (this) | SYNCHRONIZATION WITH FIRST DEVICE |
| ... | ... |

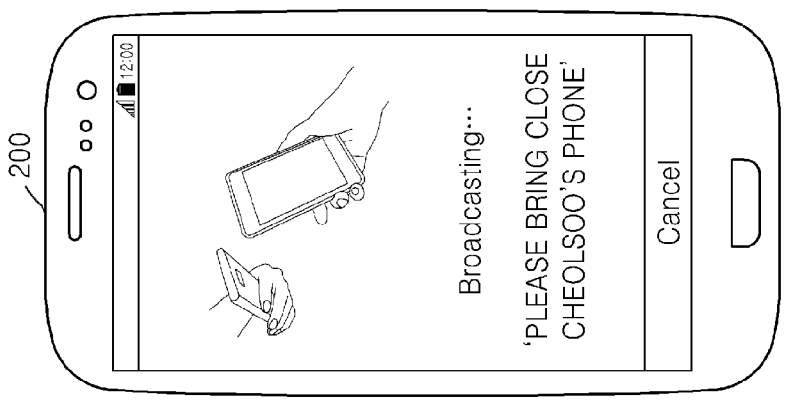
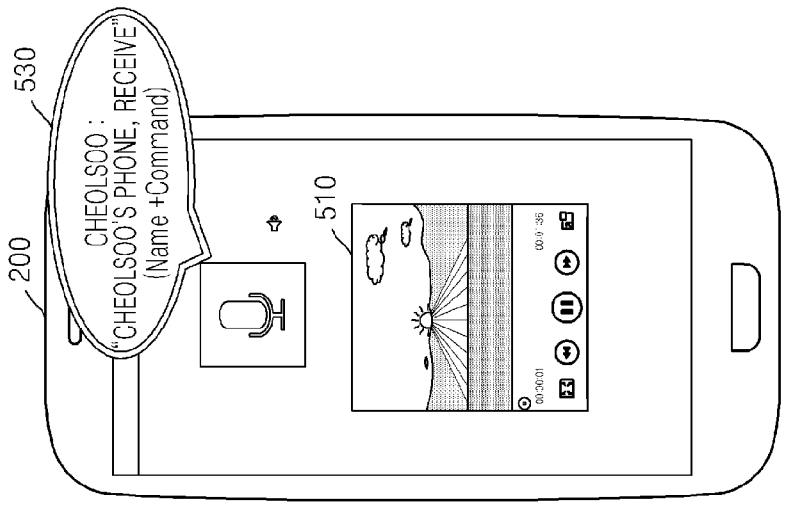
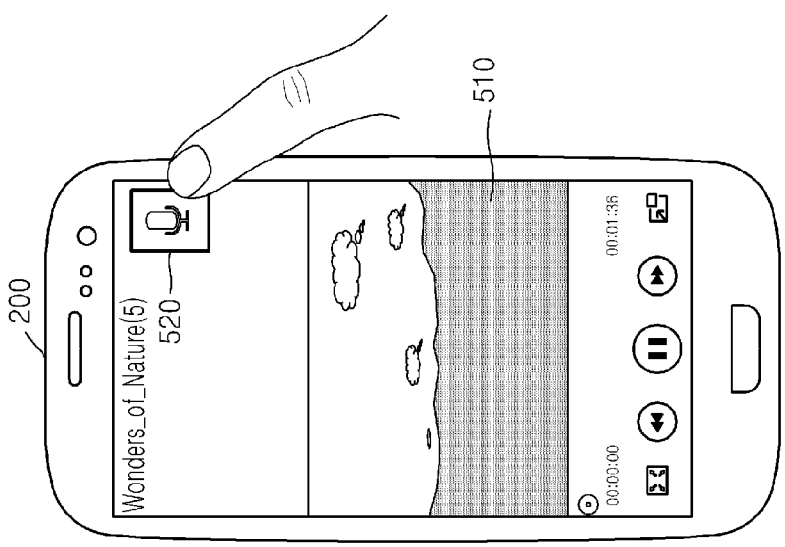

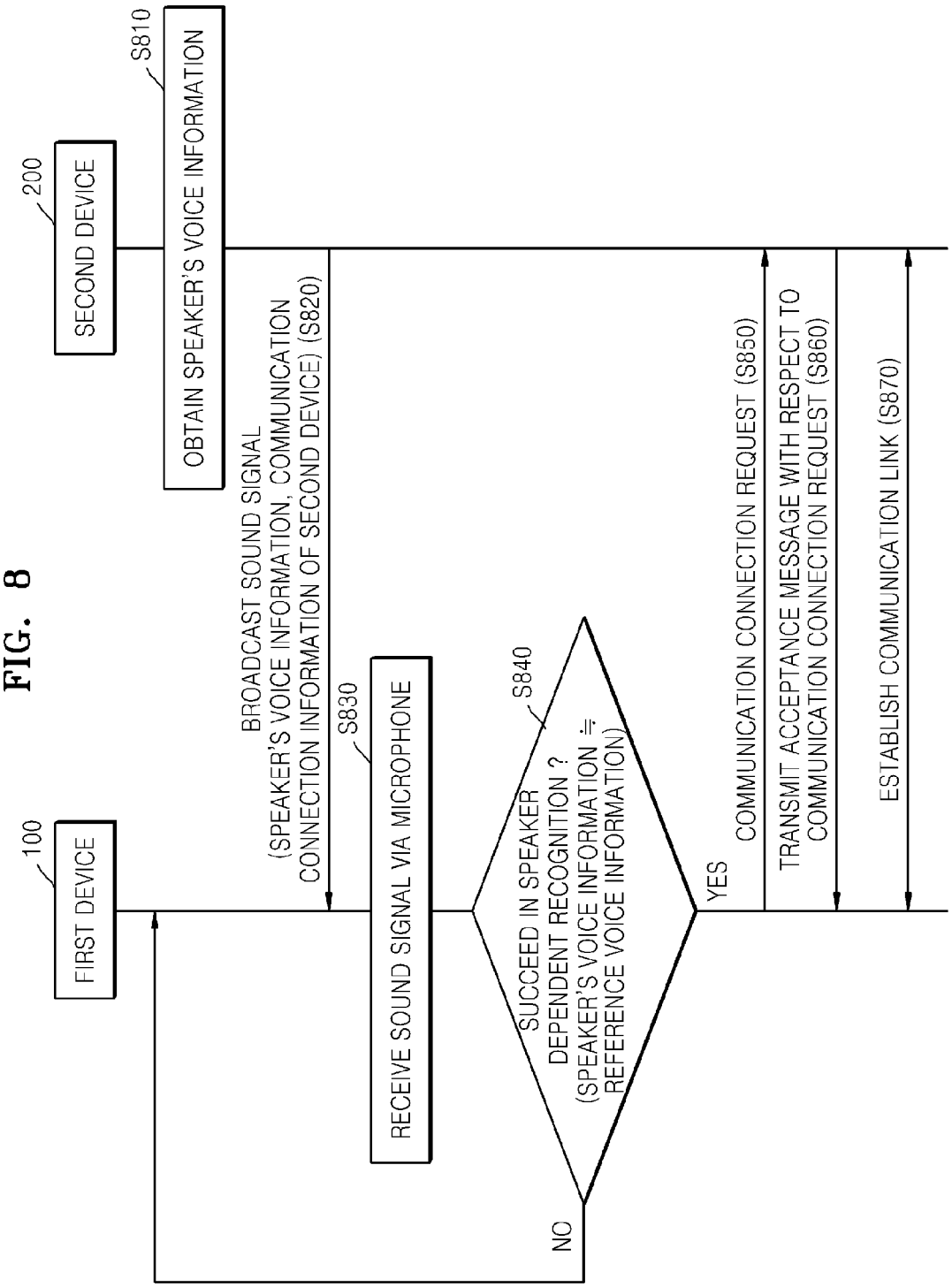

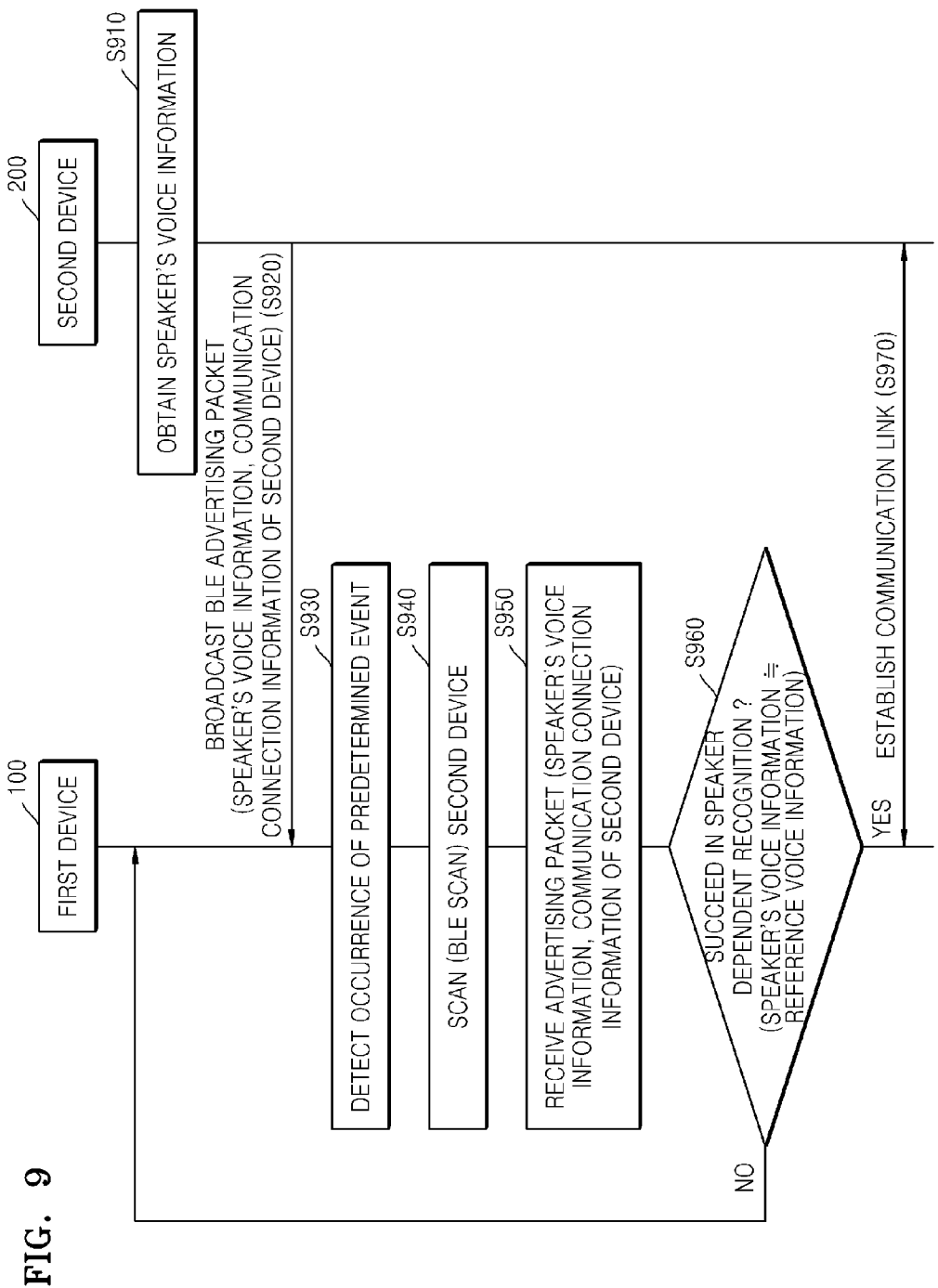

METHOD AND DEVICE FOR COMMUNICATION

CLAIM OF PRIORITY

This application claims the benefit of Korean Patent Application No. 10-2013-0085685, filed on Jul. 19, 2013, in the Korean Intellectual Property Office, the disclosure of which is incorporated herein in its entirety by reference.

BACKGROUND

1. Technical Field

A system concerns establishing a communication link between devices by using speaker voice information, for example.

2. Description of the Related Art

Voice recognition technology allows a user to control a use of a desired device or a desired information service by using a voice instead of a mouse or a keyboard. Voice recognition technology was first introduced in the 1950s and has been developed. However, due to a low voice recognition rate, voice recognition technology was not popularized until the mid 2000s.

Meanwhile, voice recognition-related technologies that have been limited to use for particular purposes are being used in portable computing terminals including smartphones and within cloud-related infrastructures.

Known systems fail to make comprehensive use of voice recognition to facilitate user friendly interaction and a user friendly interface.

SUMMARY

A system employs a communication method for facilitating establishing a communication link between devices in response to raw voice input of a speaker and transmits and receives data via the established communication link. The system A system of communicating between first and second electronic devices, comprises, in a first device, receiving from a second device, voice representative information acquired by the second device, and connection information indicating characteristics of communication to be used in establishing a communication link with the second device. The system compares the voice representative information with predetermined reference voice representative information and in response to the comparison, establishes a communication link with the second device by using the connection information received from the second device.

In a feature, the system receiving step comprises receiving a sound signal comprising the voice representative information and the connection information via a microphone of the first device.

The voice representative information and the connection information of the second device are inserted into at least one of an inaudible range and an audible range of the sound signal and are broadcast by the second device. The receiving comprises receiving the voice representative information and the connection information of the second device via at least one of, short range communication and mobile communication.

In another feature, the voice representative information comprises at least one of identification (ID) information of the first device, control information for controlling the first device, and control information for controlling the first device and the second device. The receiving of the voice representative information comprises receiving at least one of a data representing raw voice representative information and voice feature information that is extracted from the raw voice representative information. The comparing comprises determining whether a similarity between the voice representative information and the reference voice representative information is equal to or greater than a predetermined value. When the similarity is equal to or greater than the predetermined value, the establishing comprises establishing the communication link with the second device, based on the connection information of the second device. When the similarity is less than the predetermined value, broadcasting the voice representative information received from the second device. The connection information of the second device comprises at least one of, ID (identifier) information of the second device, capability information of the second device, state information of the second device, information identifying a communication method preferred by the second device, and service ID information.

In another feature, establishing comprises transmitting a connection request to the second device; and receiving an acceptance message in response to the connection request. The system receives, from the second device, control information that is extracted from the voice representative information; and performs a function in response to the control information. The control information comprises at least one of a control command to acquire content, a control command to transmit content, a control command to transmit position information, a control command to synchronize a plurality of pieces of data, a control command to switch a mode, and a control command to perform screen-mirroring. The system switches a screen lock mode of the first device to a screen unlock mode in response to the comparison.

In yet another feature, a method of communicating between first and second electronic devices, comprises in a second device, acquiring voice representative information; broadcasting the voice representative information and connection information of the second device indicating characteristics of communication to be used in establishing a communication link with the second device; receiving a communication connection request from the first device that has received the voice representative information and the connection information, from the second device; and establishing a communication link with the first device, in response to the connection request and the characteristics of communication. The broadcasting comprises periodically broadcasting a sound signal comprising the voice representative information and the connection information of the second device and by inserting the voice representative information and the connection information of the second device into at least one of an inaudible range and an audible range of the sound signal. The broadcasting comprises broadcasting the voice representative information and the connection information of the second device via at least one of short range communication and mobile communication.

In another feature the obtaining comprises receiving raw voice representative information via a microphone of the second device; and analyzing the raw voice representative information and extracting voice feature information from the raw voice representative information. The broadcasting comprises broadcasting at least one of raw voice representative information and the voice feature information extracted from the raw voice. The receiving comprises receiving the connection request from the first device in response to a result of comparing, by the first device, the voice representative information with reference voice representative information that is stored in the first device. The system extracts control information from the voice representative information; and transmits the control information to the first device. The system also performs a function in response to the control information via the communication link by transmitting content to the first device via the communication link, wherein the content is displayed on a screen of the second device when the voice representative information is obtained.

In yet another feature a system includes a first device that communicates with a second device. The first device comprises a communication unit for receiving voice representative information that is obtained by the second device, and connection information indicating characteristics of communication to be used in establishing a communication link with the second device, from the second device. A control unit compares the voice representative information with pre-stored reference voice representative information, and in response to the comparison, establishes a communication link with the second device by using the connection information received from the second device. The communication unit comprises a microphone for receiving a sound signal comprising the voice representative information and the connection information of the second device.

In a further feature, the control unit comprises a sensor hub connected with the microphone of the first device, and an application processor, wherein the sensor hub compares the voice representative information with pre-stored reference voice representative information, and switches a sleep mode of the application processor to a wake-up mode in response to the comparison, and wherein the application processor in the wake-up mode controls the communication unit to establish a communication link with the second device by using the connection information of the second device. The communication unit comprises a short range communication unit for receiving the voice representative information and the connection information of the second device via short range communication. When a similarity between the voice representative information and the reference voice representative information is equal to or greater than a predetermined value, the control unit establishes the communication link with the second device by using the connection information of the second device. When the similarity between the voice representative information and the reference voice representative information is less than the predetermined value, the control unit controls the communication unit to broadcast the voice representative information received from the second device. The communication unit receives, from the second device, control information that is extracted from the voice representative information, and wherein the control unit performs a function that corresponds to the control information.

In yet a further feature, a second device communicates with a first device. The second device comprises a microphone for receiving raw voice representative information; a voice recognition unit obtains voice representative information by analyzing the raw voice representative information; a communication unit broadcasts the voice representative information and connection information indicating characteristics of communication to be used in establishing a communication link with the second device, from the second device, and receives a connection request from the first device that has received the voice representative information and the connection information. A control unit establishes a communication link with the first device, in response to the connection request and the characteristics of communication. A non-transitory computer-readable recording medium having recorded thereon a program for executing the method of claim 1, by using a computer.

BRIEF DESCRIPTION OF THE DRAWINGS

These and/or other aspects will become apparent and more readily appreciated from the following description of the embodiments, taken in conjunction with the accompanying drawings in which:

FIG. 3 is a flowchart of a method used by a second device for extracting control information from speaker's voice information, according to invention principles;

FIG. 4 shows a command database according to invention principles;

FIG. 5A, FIG. 5B and FIG. 5C show displayed windows indicating a second device broadcasts speaker's voice information, according to invention principles;

FIG. 8 is a flowchart of a method for establishing, by the first device and the second device, a communication link for exchanging data via sound communication, according to invention principles;

FIG. 9 is a flowchart of a method for establishing, by the first device and the second device, a communication link for exchanging data via Bluetooth low energy (BLE) communication, according to invention principles;

DETAILED DESCRIPTION

Figure 1:
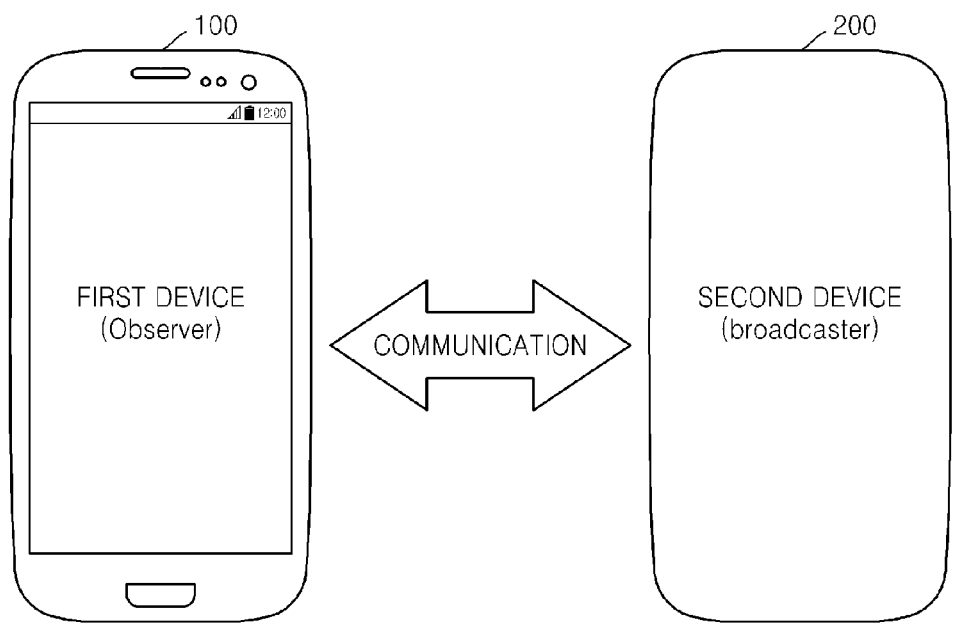
FIG. 1 shows a communication system according to invention principles.

All terms including descriptive or technical terms which are used herein should be construed as having meanings that are obvious to one of ordinary skill in the art. However, the terms may have different meanings according to an intention of one of ordinary skill in the art, precedent cases, or the appearance of new technologies. Also, some terms may be arbitrarily selected by the applicant, and in this case, the meaning of the selected terms will be described in detail in the detailed description of the invention. Thus, the terms used herein have to be defined based on the meaning of the terms together with the description throughout the specification.

Also, when a part "includes" or "comprises" an element, unless there is a particular description contrary thereto, the part may further include other elements, not excluding the other elements. In the following description, terms such as "unit" and "module" indicate a unit for processing at least one function or operation, wherein the unit and the block may be embodied as hardware or software or may be embodied by combining hardware and software.

Throughout the specification, a communication method of transmitting (e.g., broadcast, output, or transmission) or receiving information may include at least one of a short range communication method and a mobile communication method.

Also, throughout the specification, the short range communication may include not only transmission or reception of a radio frequency (RF) signal but also include transmission or reception of a sound signal. For example, the short range communication may include, but is not limited to, at least one of Wi-Fi, Bluetooth, ZigBee, Wi-Fi Direct (WFD), ultra wideband (UWB), infrared data association (IrDA), Bluetooth low energy (BLE), near field communication (NFC), Ant+, and sound communication.

Wi-Fi may include an infrastructure mode in which an access point (AP) that transmits a wireless signal exchanges data with a plurality of terminals (e.g., a PC, for example) within a predetermined range around the AP, and an ad-hoc mode in which terminals mutually exchange data in a peer-to-peer (P2P) way without the AP.

Bluetooth is a standard technology for wireless communication devices that perform wireless communication therebetween within a short range, by using low power. UWB is a wireless communication technology used to transmit a large amount of data in a short period via a large spectrum frequency, by using low power.

WFD is a new version of Wi-Fi technology and is mainly characterized in that it incorporates direct communication between devices. For example, according to WFD, although there is not a hotspot, a router, or an AP, if the devices use WFD, the devices may communicate with each other and thus may share information therebetween.

ZigBee is one of the IEEE 802.15.4 standards that support short-range wireless communication. ZigBee is a technology for short-range wireless communication within a distance of 10-20 m and ubiquitous computing in a wireless networking environment such as one that is established in a house or an office.

BLE refers to a core function of Bluetooth v. 4.0 that is one of the short range communication technologies. BLE has a relatively small duty cycle compared to a classic Bluetooth specification, may be produced at low costs, and may operate for several years with a coin-sized battery due to reduced mean power and standby power.

NFC, which is a sort of radio frequency ID (RFID) or electronic tag, refers to a non-contact short range wireless communication using a frequency band of 13.56 MHz. NFC enables data communication between devices at a distance of 10 cm through a short range wireless communication technology. NFC may include a P2P mode, a reader/writer (R/W) mode, and a card emulation mode. Ant+ signifies a wireless communication technology with low power consumption and for a short range by using a frequency band of 2.4 GHz.

In the following description, well-known functions or constructions are not described in detail since they would obscure the one or more embodiments of the invention with unnecessary detail, and like reference numerals in the drawings denote like or similar elements throughout the specification.

As used herein, the term "and/or" includes any and all combinations of one or more of the associated listed items. Expressions such as "at least one of," when preceding a list of elements, modify the entire list of elements and do not modify the individual elements of the list.

FIG. 1 is a diagram illustrating a communication system according to invention principles.

As illustrated in FIG. 1, the communication system may include a first device 100 and a second device 200. Throughout the specification, the first device 100 may be an observer that receives a signal or information which is broadcast (or transmitted) by an external device, and the second device 200 may be a broadcaster that advertises (or transmits) its own identification (ID) information. Hereinafter, the first device 100 and the second device 200 are respectively described below.

The first device 100 may include at least one communication unit for communicating with an external device. For example, the first device 100 may include, but is not limited to, a short range communication unit (for example, a BLE communication unit, a WFD communication unit, for example), a mobile communication unit (for example, 2G, 3G, 4G, for example), and a microphone for receiving a sound signal.

The first device 100 may receive a signal that is transmitted by the second device 200, by using the at least one communication unit. For example, the first device 100 may receive a sound signal that is output from the second device 200 via the microphone. The first device 100 may also receive an advertising packet that is broadcast via BLE communication.

The first device 100 may scan the second device 200 by analyzing the signal that is transmitted by the second device 200. For example, the first device 100 may receive speaker's voice information and communication connection information of the second device 200, which are broadcast by the second device 200. The first device 100 may perform speaker dependent recognition in which the speaker's voice information is compared with reference voice information of a particular speaker. The speaker dependent recognition performed by the first device 100 will be described in detail with reference to FIG. 7.

The first device 100 may analyze the communication connection information of the second device 200 which is broadcast by the second device 200, so that the first device 100 may recognize ID information of the second device 200, capability information about a communication method that is supported by the second device 200, information about a communication method that is preferred by the second device 200, state information of the second device 200, service ID information of the second device 200, for example.

The first device 100 may automatically scan the second device 200 in response to a predetermined event (e.g., a value of a magnetic sensor is equal to or greater than a predetermined value), although a user does not separately request a scan of the second device 200. The first device 100 may include a seamless sensing platform (SSP) that operates separately from an application processor. Here, the first device 100 may connect a sensing unit or a communication unit (e.g., the microphone, the BLE communication unit, for example) to a sensor hub of the SSP. The sensor hub of the SSP may recognize an inner condition of the first device 100 and ambient conditions around the first device 100 by collecting sensing information or scanning the second device 200, without waking up the AP from a sleep mode. The sensor hub may be embodied as hardware or software or may be embodied by combining hardware and software. For example, the sensor hub may include a micro controller unit (MCU).

The sensor hub of the SSP may wake up the AP in the sleep mode when a predetermined situation occurs (e.g., the speaker dependent recognition is successfully performed). In this case, the AP may receive current status information from the sensor hub, and may demodulate modulated data or may perform a control command. The SSP will be described in detail with reference to FIG. 22.

The first device 100 may be embodied in various forms. For example, the first device 100 may be, but is not limited to, a mobile phone, a smartphone, a laptop computer, a tablet PC, an E-book device, a digital broadcasting terminal, a personal digital assistant (PDA), a portable multimedia player (PMP), a navigation device, an MP3 player, a digital camera, a wristwatch, and consumer electronics (CE) devices (e.g., a refrigerator, an air-conditioner, a water purifier, for example) that include a microphone and a sound output device.

The second device 200 may receive a speaker's raw voice input via a microphone and may perform speaker independent recognition so as to recognize speaking of a random speaker. The second device 200 may advertise the communication connection information, including ID information of the second device 200, the capability information about the communication method that is supported by the second device 200, for example, by using at least one communication method. Here, the at least one communication method may include the short range communication method or the mobile communication method. The short range communication method may include, but is not limited to, at least one of a BLE communication method, an Ant+ communication method, an NFC method, a sound communication method, a ZigBee communication method, and a Wi-Fi communication method (e.g., a wireless LAN or WiFi Direct), and the mobile communication method may include, but is not limited to, 3G and longterm evolution (LTE) methods.

The sound communication method means a communication method of transmitting and receiving data by using a sound signal. For example, the second device 200 may broadcast data to the outside by inserting the data into an inaudible range or audible range (e.g., into music or announcement broadcasting) of the sound signal. Also, the second device 200 may down-convert a voice signal having a high frequency band into a voice signal having a relatively low frequency band (e.g., a band equal to or less than 16 kHz), and may broadcast the down-converted voice signal.

The second device 200 may be a display device including a screen or an accessory device having no screen. For example, the second device 200 may be, but is not limited to, a mobile phone, a smartphone, a laptop computer, a tablet PC, an E-book device, a digital broadcasting terminal, a PDA, a PMP, a display device, a navigation device, an MP3 player, a digital camera, a smart TV, a wireless speaker, a Bluetooth headset, a home sync, a refrigerator with a communication function, an air-conditioner, and a water purifier.

The second device 200 may include a communication unit so as to communicate with the first device 100. For example, the second device 200 may include, but is not limited to including, a short range communication unit (e.g., a Bluetooth communication unit, a BLE communication unit, an NFC/RFID unit, a WLAN (Wi-Fi) communication unit, a ZigBee communication unit, an IrDA communication unit, a WFD communication unit, a UWB communication unit, an Ant+ communication unit, for example), a mobile communication unit (e.g., 2G, 3G, and 4G), a sound output unit, a microphone, and a display unit.

Figure 2:
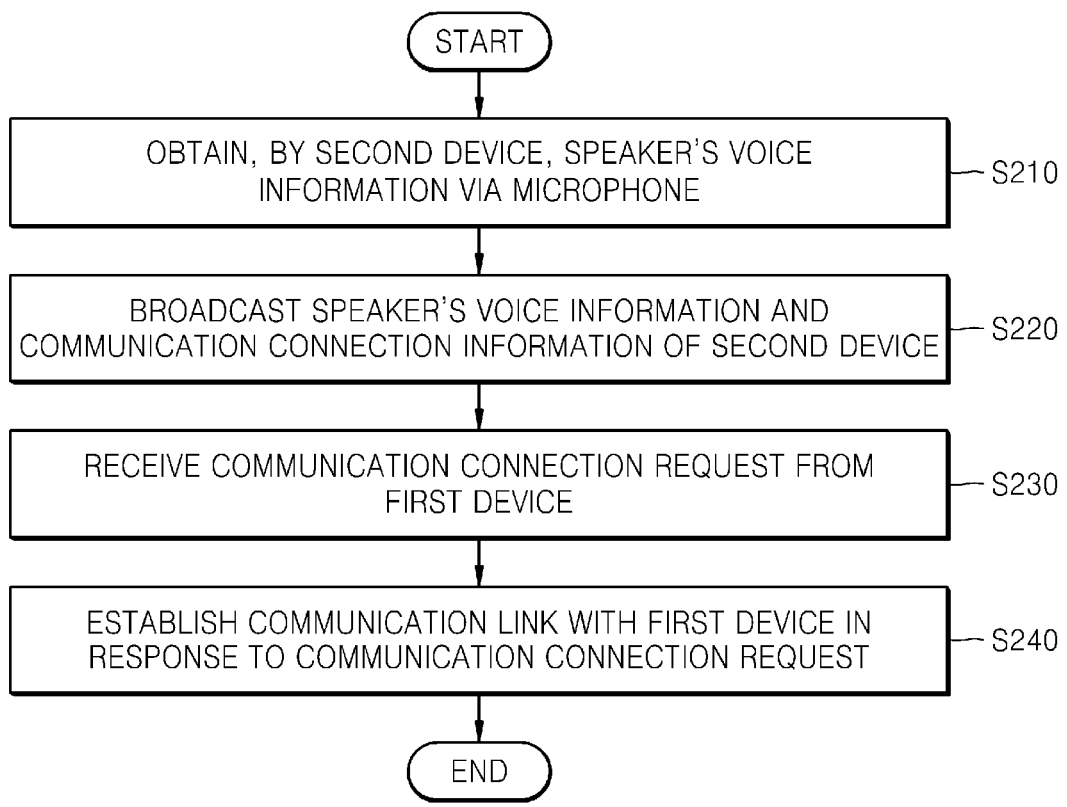
FIG. 2 shows a flowchart of a method for communication used by a second device, according to invention principles.

Hereinafter, a process in which the second device 200 establishes a communication link with the first device 100 by broadcasting (or transmitting) speaker's voice information and communication connection information by using at least one communication method will be described below in detail with reference to FIG. 2. FIG. 2 is a flowchart of a communication method performed by the second device 200, according to invention principles.

In operation S210, the second device 200 may obtain speaker's voice information via a microphone. In the present embodiment, the speaker's voice information may be a raw voice that is input by a speaker or may be voice feature information extracted from the raw voice that is input by the speaker. The second device 200 may perform speaker independent recognition on the raw voice that is input by the speaker. For example, the second device 200 may recognize the raw voice that is input by the speaker, regardless of a voice tone, a pronunciation, an accent, for example of the speaker. The second device 200 may detect an end point from the input raw voice. The end point detection means detects a start and end of a recognition target period from the raw voice, which is a recognition target. When the second device 200 detects the period of the recognition target via the end point detection, the second device 200 may remove a noise component and may extract a voice feature from the recognition target period of the recognition target. The second device 200 may compare the extracted voice feature with a voice database and may output a particular expression as a recognition result, or may output a particular sentence as a recognition result by using a language model.

In operation S220, the second device 200 may broadcast (or transmit) the speaker's voice information and communication connection information of the second device 200. Here, the second device 200 may broadcast the raw voice that is input by the speaker or may broadcast the voice feature information extracted from the raw voice that is input by the speaker. The communication connection information of the second device 200 may mean information that an external device may use so as to request the second device 200 for communication connection. For example, the communication connection information of the second device 200 may include, but is not limited to, ID information of the second device 200, capability information of the second device 200, information about a communication method that is preferred by the second device 200, state information of the second device 200, and service ID information of the second device 200.

The ID information may be unique information for identifying the second device 200, and may include a media access control (MAC) address, a device ID, a device name, a product serial number, a nickname, for example. The capability information relates to a function supported by the second device 200 and may include, for example, but is not limited to including, information about supported communication methods (e.g., BLE, Bluetooth, NFC, Wi-Fi, for example), information about a mounted sensor (e.g., a magnetic sensor, an accelerometer sensor, a temperature sensor, a gyroscope sensor, a proximity sensor, for example), and information about available services (e.g., universal plug and play (UPnP), digital living network alliance (DLNA), for example). The state information is information indicating a current state of the second device 200 and may include, for example, but is not limited to including, information about an active or inactive state of a communication unit, information about an active or inactive state of a sensor, and information about a mode set on the second device 200 (e.g., a lock mode, an operation mode, a vibration mode, an automatic screen rotation mode, a sync mode, for example).

The service ID information may be unique information for identifying a service that the second device 200 attempts to receive via communication connection. For example, the service ID information may include an identifier indicating a service including a content sharing service, a game service, a chatting service, an identifier indicating an application, a program, which are used in the communication connection.

The service ID information may correspond to a particular communication connection service. Service information including an application, a communication method, a protocol, for example, which are used for the particular communication connection service may be previously set or appointed while the service information is mapped with the service ID information. Here, the service information (e.g., the communication connection service indicated by the service ID information) that corresponds to the service ID information may be previously stored in memories of devices (e.g., the first device 100 and the second device 200) that participate in the communication connection service.

The information about a preferred communication method may mean information about a priority order of communication methods that are preferred by the second device 200. For example, the second device 200 may prefer a Bluetooth communication method the most, and may prefer a WFD communication method the second-most. The second device 200 may broadcast (e.g. an output or transmission) a sound signal to the outside via a speaker, wherein the speaker's voice information and the communication connection information of the second device 200 are inserted into the sound signal. For example, the second device 200 may insert the speaker's voice information and the communication connection information of the second device 200 into an inaudible range or an audible range of the sound signal. The second device 200 may convert (e.g., down-convert) a frequency band of the sound signal including voice information into a relatively low frequency broadband. For example, when a sensor hub (e.g., the MCU) to which the microphone of the first device 100 is connected can only process a voice signal below 16 kHz, the second device 200 may down-convert a voice signal, which is inserted in the range of about 16 kHz to about 21 kHz, into a voice signal having a band below 16 kHz.

The second device 200 may process advertisement information including the speaker's voice information and the communication connection information of the second device 200 in the form of an advertising packet, and may broadcast the advertisement information to the outside by using the BLE communication unit. A data packet of the advertisement information that is broadcast to the outside may include, but is not limited to, an ID information field (e.g., Name Type 'GT-I9400) indicating the ID information of the second device 200, a manufacturer field (e.g., Company ID 0X0075) indicating a manufacturer that manufactured the second device 200, a protocol field (e.g., 0X0201) indicating a protocol used by the second device 200, a capability field indicating a communication method supported by the second device 200, a state field indicating a current state of the second device 200, and a voice information field to which the voice information obtained by the second device 200 is inserted.

When the second device 200 includes a short range wireless communication tag (hereinafter, referred to as 'NFC tag'), the second device 200 may encode the advertisement information in a NFC data exchange format (NDEF). Afterward, the second device 200 may store the advertisement information that is encoded in NDEF in the NFC tag. Here, when the first device 100 approaches within a short range wireless communication range of the second device 200, the advertisement information that is stored in the NFC tag of the second device 200 may be transmitted to the first device 100.

The second device 200 may sequentially broadcast advertisement information through the communication methods. The second device 200 may sequentially broadcast advertisement information according to a predetermined order. The predetermined order may be set by a user or a system and may be changed by the user or the system. The predetermined order may be set in the order having the least power consumption or the shortest latency. The latency signifies a delay time in communicating signals between a sender and a receiver. For example, the second device 200 may determine the order of a communication method for broadcasting advertisement information to the outside in the order of the BLE communication method, the Ant+ communication method, the NFC method, and the sound communication method.

The second device 200 may modulate at least one of the speaker's voice information and the communication connection information of the second device 200. The second device 200 may broadcast the modulated data. For example, the second device 200 may broadcast the voice information that is not modulated and the modulated communication connection information of the second device 200 to the outside. Also, the second device 200 may modulate the voice information (e.g., the voice feature information) and the communication connection information of the second device 200 and may broadcast them to the outside. For information security, the second device 200 may encrypt the advertisement information by using a pre-set encryption code and may broadcast the encrypted advertisement information to the outside. Also, the second device 200 may broadcast the speaker's voice information and the communication connection information of the second device 200 at a predetermined cycle. The predetermined cycle may be adjusted by the second device 200 or a user.

In operation S230, the second device 200 may receive a communication connection request from the first device 100, based on the communication connection information of the second device 200. For example, the second device 200 may receive an advertising packet including the ID information of the first device 100, the capability information of the first device 100, the information about a preferred communication method of the first device 100, for example from the first device 100, or may receive a connection request or a negotiation request from the first device 100. In response to a result of comparing the speaker's voice information with the reference voice information that is previously stored in the first device 100, the first device 100 may transmit the communication connection request to the second device 200. This process will be described in detail with reference to FIG. 6.

In operation S240, the second device 200 may establish a communication link with the first device 100, in response to the communication connection request. Throughout the specification, the expression 'establish a communication link' means that the first device 100 and the second device 200 are in a state to exchange data by using at least one communication method. The communication link may include, but is not limited to, a BLE communication link, a sound communication link, a Bluetooth communication link, and a Wi-Fi communication link. A process in which the first device 100 establishes a communication link will be described in detail with reference to FIG. 6. The communication link may be formed by using a communication method equal to a communication method of receiving the advertisement information that is broadcast by the second device 200, or may be formed by using a communication method (e.g., an out-of-band (OOB) method) that is different from the communication method of receiving the advertisement information. For example, when the first device 100 receives the communication connection information of the second device 200, which is broadcast by the second device 200, via BLE communication, the first device 100 may establish the communication link by using the same BLE communication method or may establish the communication link by using a WFD communication method that is different from the BLE communication. A process in which the communication link is established by using the OOB method will be described in detail with reference to FIG. 14.

The communication link may be a non-connection type virtual communication link by which the first device 100 and the second device 200 exchange the advertising packet by scanning each other, or may be a connection type communication link in which a session is formed by the communication connection request from the first device 100. The second device 200 may exchange content with the first device 100 via the communication link. Throughout the specification, the term "content" means digital information that is provided via a wired or wireless communication network. The content may include, but is not limited to, moving picture content (e.g., a TV program image, video-on-demand (VOD), a personal image such as User-Created Contents (UCC), a music video, a Youtube video, for example), still image content (e.g., a photo, a picture, for example), text content (e.g., an electronic book (poetry, novels, for example), a letter, a work file, a web page, for example), music content (for example, music, radio broadcasting, for example), and an application (a widget, a game, videotelephony, for example).

The second device 200 may encode data of a partial period of reproduced content, the second device 200 may transmit the encoded data to the first device 100. Here, the second device 200 may encode the data by using various encoding algorithms. For example, the encoding algorithms may include, but is not limited to, MPEG-2, MPEG-4, H.264, and AVC. An order of operations S210 through S240 may be changed or some operations may be skipped. Hereinafter, a process, in which the second device 200 extracts control information from the speaker's voice information that is obtained via the microphone, is described. FIG. 3 is a flowchart of a method, performed by the second device 200, of extracting control information from speaker's voice information. In operation S310, the second device 200 may detect the occurrence of a predetermined event. Here, the predetermined event may indicate an event that activates a microphone in an inactive state. Also, the predetermined event may indicate an event that informs the second device 200, a start of a speaker's raw voice input.

A predetermined event may be an event comprising selection of a predetermined button. Here, the predetermined button may be a button in the form of a Graphical User Interface (GUI) displayed on a screen or may be a button that is physically attached on the second device 200. An example of the predetermined event may include an event that executes an application. In operation S320, the second device 200 may receive the speaker's raw voice input via the microphone. Also, the second device 200 may obtain speaker's voice information by performing speaker independent recognition on the speaker's raw voice input. For example, the second device 200 may detect an end point of a speaker's voice and may extract a voice feature from the speaker's voice. The second device 200 may change the speaker's voice into a particular expression or a particular sentence by using the voice feature. Since operation S320 corresponds to operation S210 of the flowchart shown in FIG. 2, detailed descriptions thereof are omitted here.

In operation S330, the second device 200 may extract control information from the speaker's voice information. The speaker's raw voice input may include ID information of the first device 100, and the control information for controlling at least one of the first device 100 and the second device 200. The ID information of the first device 100, included in the speaker's raw voice input, may be a name of the first device 100, which is set by a speaker. For example, the ID information of the first device 100 may include a device name, a nickname (e.g., Tom's phone, for example). The ID information of the first device 100, included in the speaker's raw voice input, may be stored in a memory of the first device 100. The control information may include a command to control at least one of the first device 100 and the second device 200. For example, the control information may include a command 410 including 'receive', 'send', 'set', 'pair' or 'sync'. This is shown in FIG. 4.

The second device 200 may extract the control information included in the speaker's voice information by comparing the speaker's voice information with a command database (DB) 400. For example, in a case where a command 'receive' is pre-defined in the command DB 400, when a user inputs a voice of 'the first device 100, receive this', the second device 200 may compare the command DB 400 with voice information that is input by the user, and may extract control information including 'receive'. Here, the control information including 'receive' indicates a command that commands the first device 100 to receive content from the second device 200, so that the second device 200 may convert the control information, including 'receive', into a control command that commands preparation of transmission of the content.

In operation S340, the second device 200 may broadcast the speaker's voice information, the control information, and communication connection information of the second device 200. The second device 200 may broadcast the speaker's voice information, the control information, and the communication connection information of the second device 200 via sound communication (e.g., by using at least one of an inaudible range and an audible range of a sound signal), and short range communication (e.g., BLE communication, Ant+ communication, NFC communication, for example). Descriptions of a method, performed by the second device 200, of broadcasting the advertisement information, are the same as descriptions about operation S220 of the flowchart shown in FIG. 2, and thus are omitted here.

The second device 200 may modulate the control information and the communication connection information and may broadcast them. Also, the second device 200 may modulate the speaker's voice information, the control information, and the communication connection information of the second device 200 and may broadcast them. With reference to FIG. 5, an example in which the second device 200 broadcasts the speaker's voice information, the control information, and the communication connection information of the second device 200 will now be described.

FIG. 5 illustrates an example in which the second device 200 broadcasts speaker's voice information. As illustrated in FIG. 5(*a*), moving picture content 510 may be reproduced by the second device 200. In a case where a user (Cheolsoo) of the first device 100 attempts to transmit the moving picture content 510, which is reproduced by the second device 200, to the first device 100, the user (Cheolsoo) of the first device 100 may touch a button 520 having a microphone form displayed on a screen of the second device 200. The second device 200 may be switched to a state in which a speaker may input a voice. As illustrated in FIG. 5(*b*), the user (Cheolsoo) of the first device 100 may input a voice sequence 530 into the second device 200 by using a microphone of the second device 200. For example, the user (Cheolsoo) of the first device 100 may input voice data of "Cheolsoo's phone, receive" to the second device 200 by using the microphone of the second device 200. The second device 200 may recognize the voice of the speaker.

As illustrated in FIG. 5(*c*), the second device 200 may broadcast both voice information, which is obtained from the user (Cheolsoo) of the first device 100, and the communication connection information of the second device 200. Here, the second device 200 may broadcast a raw voice that is input by the user (Cheolsoo) of the first device 100. Alternatively, the second device 200 may broadcast voice feature information that is extracted from the voice that is input by the user (Cheolsoo) of the first device 100. The second device 200 may display an expression or a sentence, which is recognized via the voice, on the screen. For example, the second device 200 may display the sentence "Cheolsoo's phone, receive" on the screen. In this case, the speaker may check whether the speaker's voice is correctly input, and if the voice is not correctly recognized, the speaker may input a voice again. The second device 200 may extract the control information from the speaker's voice information, and may broadcast the extracted control information, the speaker's voice information, and the communication connection information of the second device 200. For example, the second device 200 may compare the voice information ('Cheolsoo's phone, receive') obtained from the speaker with the command DB 400, and may extract the control information including 'receive'. Afterward, the second device 200 may modulate and insert the control information including 'receive' into the sound signal, and may broadcast the sound signal including the control information.

A method of establishing a communication link with the second device 200, wherein the method is performed by the first device 100 that receives voice information broadcast from the second device 200, will now be described in detail with reference to FIG. 6.

Figure 6:
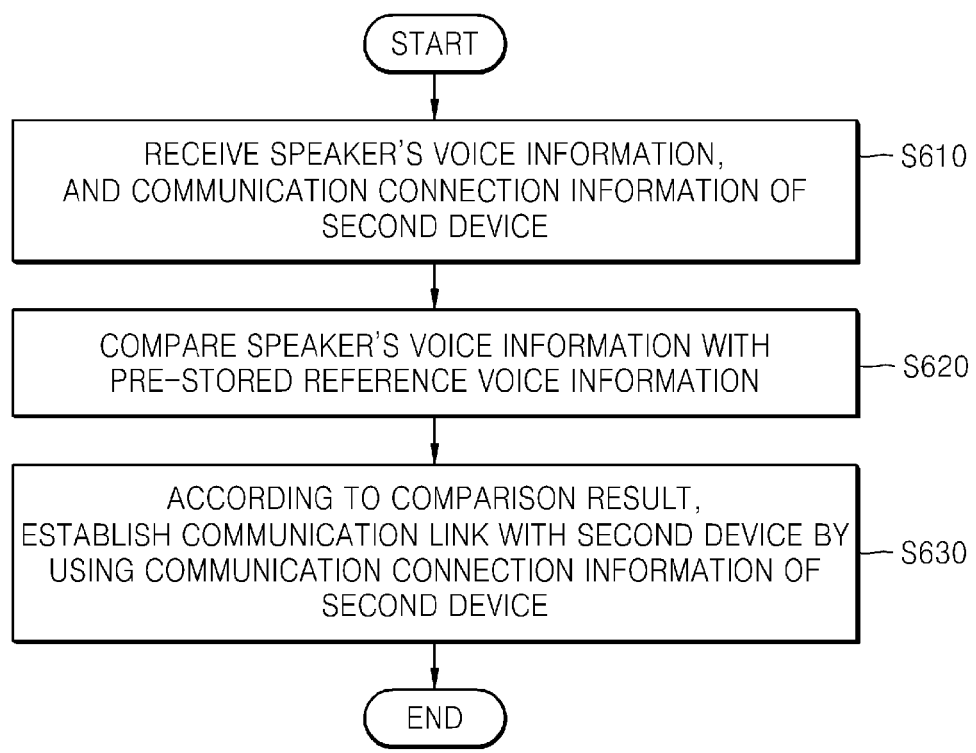
FIG. 6 is a flowchart of a method performed of communication, according to invention principles.

FIG. 6 is a flowchart of a communication method performed by the first device 100. In operation S610, the first device 100 may receive speaker's voice information that is obtained via a microphone of the second device 200, and communication connection information of the second device 200 from the second device 200. The first device 100 may receive a sound signal, including the speaker's voice information and the communication connection information of the second device 200, from the second device 200, by using a microphone of the first device 100. This process will be described in detail with reference to FIG. 8. The first device 100 may receive the speaker's voice information and the communication connection information of the second device 200 via short range communication. For example, the first device 100 may receive the speaker's voice information and the communication connection information of the second device 200 by using at least one of BLE communication, Ant+ communication, NFC, and ZigBee. This process will be described in detail with reference to FIG. 9.

The first device 100 may receive a speaker's raw voice from the second device 200 or may receive, from the second device 200, voice feature information that is extracted from the speaker's raw voice. The first device 100 may receive modulated speaker's voice information or modulated communication connection information of the second device 200. In operation S620, the first device 100 may compare the speaker's voice information with reference voice information that is previously stored in the first device 100. The reference voice information may indicate information about a predetermined expression that a user of the first device 100 previously trained by using a user's own voice so as to perform speaker independent recognition. The first device 100 may determine whether a similarity between the reference voice information and the speaker's voice information that is received from the second device 200 is equal to or greater than a predetermined value. For example, the first device 100 may determine whether the similarity between the reference voice information and the speaker's voice information that is received from the second device 200 is at least about 97%.

When the similarity between the reference voice information and the speaker's voice information that is received from the second device 200 is equal to or greater than the predetermined value, the first device 100 may determine that a use of the first device 100 or a user of the first device 100 is authorized. The user of the first device 100 may input a predetermined expression by using the user's own voice, and by doing so, the user may obtain a result similar to a case in which the user inputs a pre-set password or a pre-set pattern to the first device 100. This will be described in detail with reference to FIG. 7.

In operation S630, the first device 100 may establish the communication link with the second device 200, in response to a result of comparing the reference voice information and the speaker's voice information that is received from the second device 200. When the similarity between the reference voice information and the speaker's voice information that is received from the second device 200 is equal to or greater than the predetermined value (e.g., about at least about 97%), the first device 100 may establish the communication link with the second device 200 based on the communication connection information of the second device 200.

For example, the first device 100 may transmit a communication connection request to the second device 200, based on ID information (e.g., a MAC address) of the second device 200, capability information (e.g., a support of BLE, Bluetooth, Ant+, Wi-Fi, NFC) of the second device 200, state information (e.g., Wi-Fi off/Bluetooth on) of the second device 200, information about a communication method (e.g., Bluetooth) that is preferred by the second device 200, or service ID information (e.g., an identifier indicating a service such as a content sharing service, a game service, a chatting service, an identifier indicating an application, a program used in the communication connection). The first device 100 may receive an acceptance message from the second device 200 in response to the communication connection request, and may establish the communication link with the second device 200.

The communication link may be a non-connection type virtual communication link by which the first device 100 and the second device 200 exchange an advertising packet by scanning each other, or may be a bidirectional connection type communication link in which a session is formed by the communication connection request from the first device 100. The communication link may include, but is not limited to, a BLE communication link, a sound communication link, a Bluetooth communication link, and a Wi-Fi communication link. When the similarity between the reference voice information and the speaker's voice information that is received from the second device 200 is less than the predetermined value (e.g., about at least about 97%), the first device 100 may broadcast again the speaker's voice information that is received from the second device 200. For example, when the similarity between the reference voice information and the speaker's voice information that is received from the second device 200 is about 10%, the first device 100 may broadcast the speaker's voice information to the outside. In response to the result of comparing the reference voice information and the speaker's voice information that is received from the second device 200, the first device 100 may switch a screen lock mode into a screen unlock mode. In this case, the first device 100 may automatically display content, which is received from the second device 200, on its screen.

Figure 7:
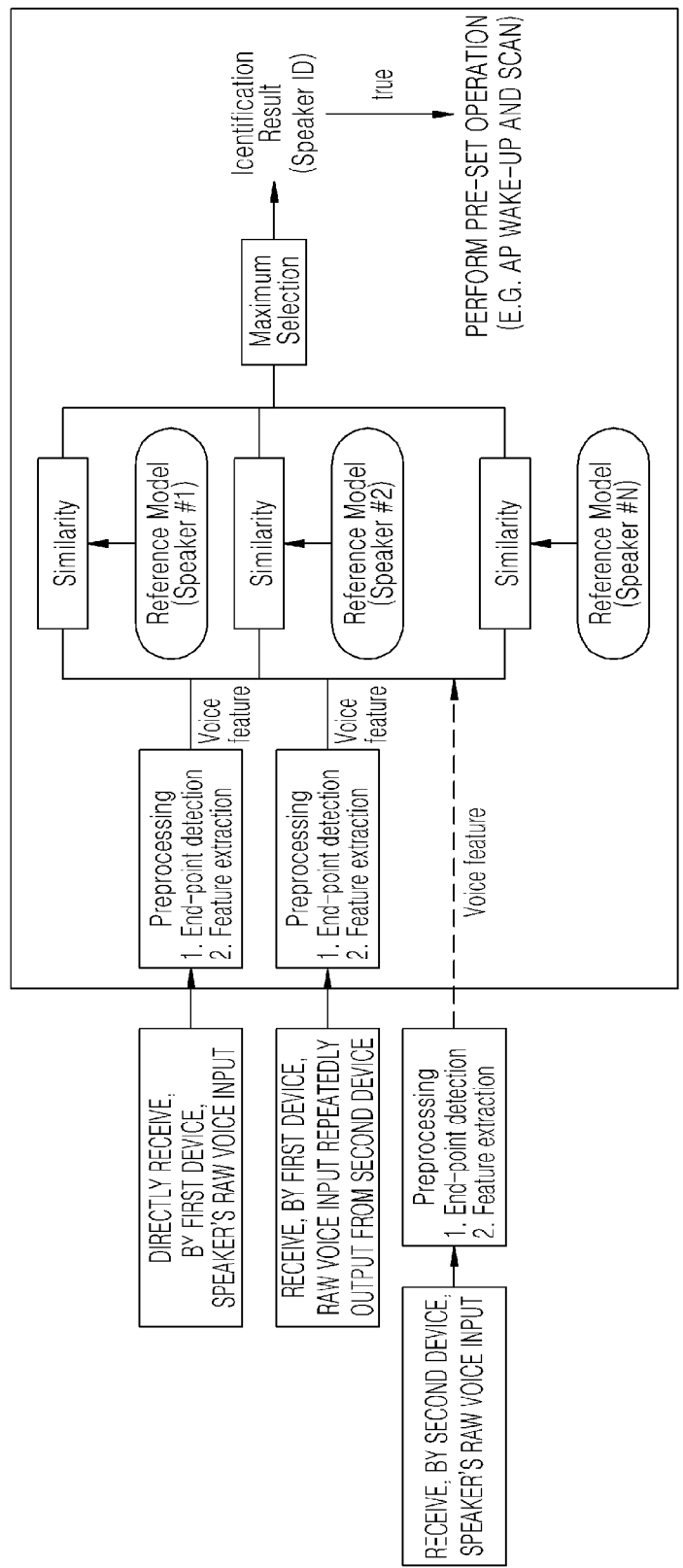
FIG. 7 shows a method, performed by the first device, of performing speaker dependent recognition, according to invention principles.

Hereinafter, referring to FIG. 7, a method, performed by the first device 100, of performing speaker dependent recognition, will now be described in detail. FIG. 7 illustrates a method, performed by the first device 100, of performing speaker dependent recognition. It is assumed that a user of the first device 100 inputs a raw voice via a microphone of the second device 200. When the first device 100 and the second device 200 are positioned within a short distance of each other, the first device 100 may directly receive the raw voice of the user of the first device 100, which is input to the microphone of the second device 200, via the microphone of the second device 200.

In this case, the first device 100 may compare a pre-stored reference voice with the raw voice of the user of the first device 100, which is directly received by the first device 100. For example, the first device 100 may detect a recognition target period of the raw voice by performing end point detection, and may extract a feature (or a pattern) of the raw voice from the recognition target period. When the feature (or the pattern) of the raw voice matches a feature (or a pattern) of the reference voice, the first device 100 may perform a pre-set operation. For example, the first device 100 may change a mode of an application processor from a sleep mode to a wake-up mode, or may search for an external device. Throughout the specification, the fact that the feature (or the pattern) of the raw voice matches the feature (or the pattern) of the reference voice may mean that a similarity between the feature (or the pattern) of the raw voice and the feature (or the pattern) of the reference voice is equal to or greater than a predetermined value.

The first device 100 may receive a raw voice of the user of the first device 100 via a microphone, wherein the raw voice is repeatedly broadcast by the second device 200. First device 100 may compare a feature (or a pattern) of a reference voice with a feature (or a pattern) of the raw voice that is received from the second device 200. When the feature (or the pattern) of the raw voice matches the feature (or the pattern) of the reference voice, the first device 100 may perform a pre-set operation. The second device 200 may detect a recognition target period of a raw voice by performing end point detection, wherein the raw voice is input by the user of the first device 100, and may extract a feature (or a pattern) of the raw voice from the recognition target period. The second device 200 may broadcast voice feature information about the extracted raw voice. The first device 100 may receive the voice feature information from the second device 200. The first device 100 may compare the voice feature information with a feature (or a pattern) of a reference voice previously stored in the first device 100. When the feature (or the pattern) of the raw voice of the voice feature information matches the feature (or the pattern) of the reference voice, the first device 100 may perform a pre-set operation.

The first device 100 may include a plurality of pieces of reference voice information. For example, when first reference voice information of a first user and second reference voice information of a second user are input, the first device 100 may perform a pre-set operation.

The first device 100 may store reference voice information (a pre-set raw voice) of a user (e.g., a person named "Cheolsoo") in a memory. The reference voice information may be a raw voice of the user or voice feature information that is extracted from the raw voice of the user. For example, the reference voice information may correspond to a voice of the user (Cheolsoo) who actually says "Cheolsoo phone". When the first device 100 receives the reference voice information via the microphone, the first device 100 may perform a pre-set operation. For example, the reference voice information that is input to the first device 100 may allow the application processor of the first device 100 to change its mode into a wake-up mode or may include a wake-up voice capable of unlocking a screen lock. Although the first device 100 is in a screen lock mode or the application processor is in a sleep mode, the first device 100 may activate the microphone. The microphone may be connected to a sensor hub of the first device 100.

The sensor hub of the first device 100 may recognize whether the voice "Cheolsoo phone" is received as the reference voice information via the microphone. When the sensor hub of the first device 100 recognizes the reception of the reference voice information, the sensor hub of the first device 100 may activate the application processor or may unlock the screen lock mode, so that the sensor hub of the first device 100 may control the first device 100 to transit to a state in which the user may use the first device 100. Where the user (e.g., Cheolsoo) of the first device 100 attempts to receive an inter-device communication connection service by connecting communication to the second device 200, as described above with reference to FIG. 5, the user (e.g., Cheolsoo) may say "Cheolsoo phone" as the wake-up voice of the first device 100 and may input "Cheolsoo phone" to the second device 200. The button 520 of FIG. 5 may correspond to an application that provides the inter-device communication connection service. Also, the button 520 may correspond to an application capable of performing or controlling a voice recognition service in the second device 200. When the second device 200 receives the voice "Cheolsoo phone", the second device 200 may broadcast (or transmit) at least one of voice information (a raw voice or voice feature information) corresponding to the voice "Cheolsoo phone" and communication connection information for connecting communication to the second device 200.

The first device 100 that is positioned around the second device 200 may recognize reception of voice information that corresponds to the wake-up voice "Cheolsoo phone" via the microphone and the sensor hub, and may switch a mode of the application processor into the wake-up mode. Also, the first device 100 may transmit a communication connection request to the second device 200 by using the communication connection information. The first device 100 may establish a communication link with the second device 200 according to a communication connection procedure that is pre-set, based on the communication connection information.

A process in which the first device 100 performs a pre-set operation according to a result of comparison between received voice information and reference voice information will now be described in detail with reference to FIGS. 8 and 9.

FIG. 8 is a flowchart of a method of establishing, by the first device 100 and the second device 200, a communication link for exchanging data via sound communication. In operation S810, the second device 200 may obtain speaker's voice information. For example, a user of the first device 100 may vocally input a predetermined expression into a microphone of the second device 200. The predetermined expression may be a title that is previously known to the first device 100. The predetermined expression may be an expression that the user of the first device 100 used to previously train the device 100 voice recognition unit and to facilitate speaker independent recognition. Since operation S810 corresponds to operation S210 of FIG. 2, detailed descriptions thereof are omitted here. In operation S820, the second device 200 may broadcast a sound signal including the speaker's voice information and communication connection information of the second device 200. The sound signal that is broadcast by the second device 200 may be a raw voice that is input by a speaker or may be voice feature information extracted from the raw voice that is input by the speaker.

The second device 200 may broadcast the sound signal to the outside via a speaker, wherein the speaker's voice information and the communication connection information of the second device 200 are inserted into the sound signal. For example, the second device 200 may insert the speaker's voice information and the communication connection information of the second device 200 into an inaudible range or an audible range of the sound signal. The second device 200 may transform (e.g., down-conversion) a frequency band of the voice signal including voice information into a relatively low frequency band. For example, the second device 200 may insert modulated communication connection information of the second device 200 into a first period (e.g., a band between about 18 kHz and about 21 kHz) of the sound signal, and may insert the speaker's voice information into a second period (a band equal to or less than 16 kHz) of the sound signal.

In operation S830, the first device 100 may receive the sound signal via a microphone of the first device 100, wherein the sound signal includes the voice information broadcast by the second device 200. In operation S840, the first device 100 may perform speaker dependent recognition based on the speaker's voice information included in the sound signal. For example, the microphone of the first device 100 may be connected to a sensor hub of the first device 100 and may remain active. The sensor hub may obtain, via the microphone, the speaker's voice information included in the sound signal that is broadcast by the second device 200. The sensor hub may compare reference voice information with the speaker's voice information. For example, the sensor hub may determine whether a similarity between the speaker's voice information and the reference voice information is equal to or greater than a predetermined value (e.g., about 97%). As a result of the determination, when the similarity between the speaker's voice information and the reference voice information is equal to or greater than the predetermined value (e.g., about 97%), the sensor hub may wake up an application processor in a sleep mode. On the other hand, when the similarity between the speaker's voice information and the reference voice information is less than the predetermined value (e.g., about 97%), the sensor hub may not wake up the application processor in a sleep mode. The application processor may remain in the sleep mode, so that the first device 100 may reduce power consumption by the application processor.

In another embodiment, the application processor of the first device 100 may receive, via the microphone, the speaker's voice information that is broadcast by the second device 200, and may determine whether the similarity between the speaker's voice information and the reference voice information is equal to or greater than a predetermined value.

In operation S850, when the first device 100 succeeds in performing the speaker dependent recognition, the first device 100 may transmit a communication connection request to the second device 200 based on communication connection information of the second device 200. For example, when the sensor hub wakes up the application processor in the sleep mode, the application processor may demodulate modulated communication connection information of the second device 200. The application processor may transmit a communication connection request to the second device 200 by using demodulated communication connection information of the second device 200. In another embodiment, the sensor hub may demodulate the modulated communication connection information of the second device 200. In operation S860, the second device 200 may receive the communication connection request and may transmit an acceptance message with respect to the communication connection request. Afterward, in operation S870, the first device 100 and the second device 200 may establish a communication link.

The second device 200 may not approve the communication connection request according to a first connection method of the first device 100 but may select another connection method (a second connection method) and may transmit a communication connection request to the first device 100. Here, when the first device 100 transmits an acceptance message with respect to the communication connection request according to the second connection method to the second device 200, the first device 100 and the second device 200 may establish a communication link according to the second connection method.

When the user of the first device 100 vocally inputs a predetermined expression into the second device 200, the first device 100 and the second device 200 may automatically establish a communication link by using a voice recognition technology. The order of operations S810 through S870 may be changed or some operations may be skipped. Hereinafter, a process in which the second device 200 broadcasts (or transmits) voice information via BLE communication will now be described with reference to FIG. 9.

FIG. 9 is a flowchart of a method of establishing, by the first device 100 and the second device 200, a communication link for exchanging data via BLE communication. In operation S910, the second device 200 may obtain speaker's voice information. Operation S910 corresponds to operation S810 of FIG. 8, thus, detailed descriptions thereof are omitted. In operation S920, the second device 200 may broadcast an advertising packet, including the speaker's voice information and communication connection information of the second device 200, via the BLE communication. The second device 200 may configure the advertising packet in response to speaker voice data input and may broadcast the advertising packet, or may broadcast the advertising packet when a BLE device is positioned around the second device 200. For example, the second device 200 may broadcast an advertising packet including voice information in response to the second device 200 scanning the first device 100 that broadcasts ID information, capability information, for example via the BLE communication.

In operation S930, the first device 100 may detect the occurrence of a predetermined event. Here, the predetermined event may trigger scanning an external device. For example, the predetermined event may include an event in which a value of magnetic field information obtained via a magnetic sensor is equal to or greater than a value of pre-set reference magnetic field information, an event in which color information obtained via an RGB sensor matches reference color information, or an event in which sound information obtained via a microphone matches reference sound information. A detailed description of the predetermined event will be provided below with reference to FIGS. 10 and 11.

In operation S940, when the first device 100 detects the occurrence of the predetermined event, the first device 100 may scan the second device 200. For example, when the value of the magnetic field information obtained via the magnetic sensor is equal to or greater than the value of the pre-set reference magnetic field information, the first device 100 may perform a BLE scan. In this case, the first device 100 performs the BLE scan when a device that includes a magnetic substance (e.g., a speaker) is around the first device 100, thus, the first device 100 may not waste power. In another embodiment, the first device 100 may periodically perform the BLE scan, regardless of the occurrence of the predetermined event.

In operation S950, the first device 100 may receive the advertising packet that is broadcast by the second device 200. In operation S960, the first device 100 may perform speaker dependent recognition, based on the voice information included in the advertising packet. A sensor hub of the first device 100 may be connected to a BLE communication unit. The sensor hub may receive, via the BLE communication unit, the speaker's voice information and the communication connection information of the second device 200 that are broadcast by the second device 200. The sensor hub may compare reference voice information with the speaker's voice information. For example, the sensor hub may determine whether a similarity between the speaker's voice information and the reference voice information is equal to or greater than a predetermined value (e.g., about 97%).

In another embodiment, an application processor of the first device 100 may receive, via the BLE communication unit, the speaker's voice information that is broadcast by the second device 200, and may determine whether the similarity between the speaker's voice information and the reference voice information is equal to or greater than a predetermined value. In operation S970, when the first device 100 succeeds in performing the speaker dependent recognition, the first device 100 may establish a communication link with the second device 200, based on the communication connection information of the second device 200 that is included in the advertising packet.

For example, the sensor hub of the first device 100 may demodulate modulated communication connection information of the second device 200. The sensor hub of the first device 100 may transmit a communication connection request to the second device 200 by using demodulated communication connection information (e.g., a MAC address, information about a communication method that is supported by the second device 200, for example) of the second device 200. In another embodiment, the application processor of the first device 100 may demodulate the modulated communication connection information of the second device 200. The second device 200 broadcasts the advertising packet via the BLE communication. The second device 200 may broadcast the speaker's voice information and the communication connection information of the second device 200 via other short range communication (e.g., Ant+ communication, NFC, ZigBee, for example).

Figure 10A:
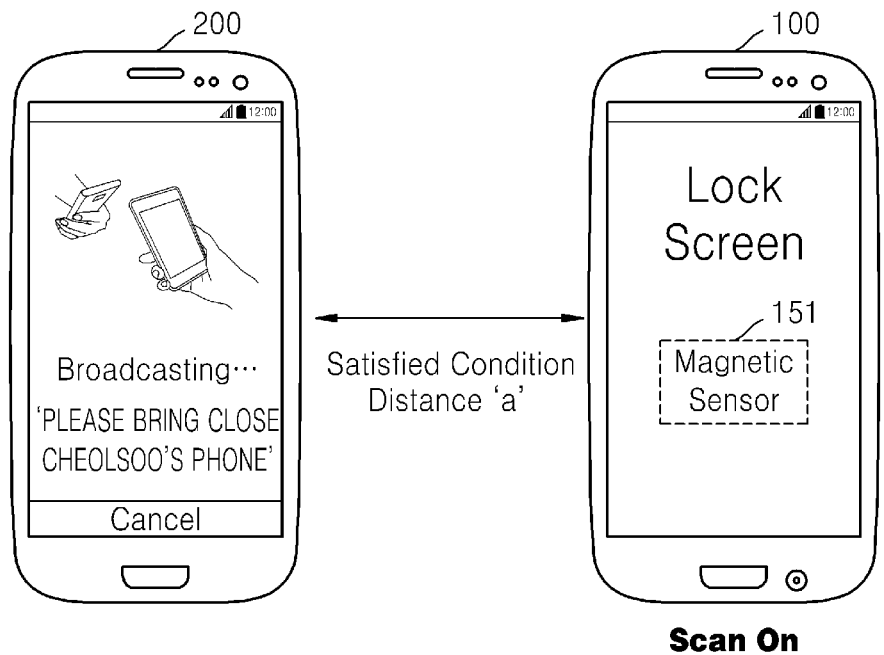
FIG. 10A and FIG. 10B illustrate a first device scanning a second device based on a value of a magnetic sensor, according to invention principles.
Figure 10B:
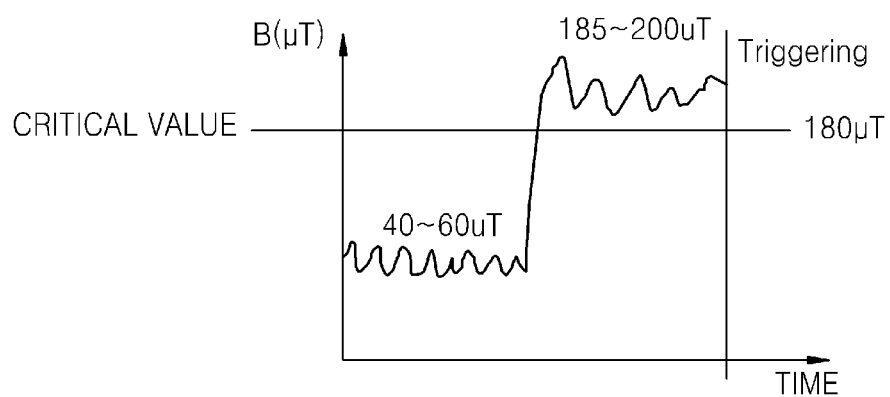

An order of operations S910 through S970 may be changed or some operations may be skipped. Hereinafter, a predetermined event that controls the first device 100 to scan the second device 200 will now be described with reference to FIGS. 10 and 11. FIG. 10 illustrates an example in which the first device 100 scans the second device 200 based on a value of a magnetic sensor. As illustrated in FIG. 10(a), the first device 100 may include a magnetic sensor 151. The magnetic sensor 151 is a sensor that senses a magnetic field. The magnetic sensor 151 may include three sensors that measure the intensity of a magnetic field in X, Y, and Z-axes directions. Thus, the first device 100 may obtain magnetic field information via the magnetic sensor 151.

The magnetic field information may be information about a direction of a magnetic field, the intensity of the magnetic field, a magnetic force, a change in the magnetic field, a change in the magnetic force, for example. Also, the magnetic field information may be an integer value of the intensity of the magnetic field or magnetic force, or a vector having a direction and intensity.

For example, the magnetic field information may correspond to a total sum of three vectors ($\sqrt{x^2+y^2+z^2}$), a size of a vector from among the X, Y, and Z-axes (|x|, |y|, or |z|), or a total sum of two vectors from among the X, Y, and Z-axes ($\sqrt{x^2+y^2}$, $\sqrt{x^2+z^2}$, or $\sqrt{y^2+z^2}$). Also, the magnetic field information may correspond to a total sum obtained by adding the squares of three vectors.

The first device 100 may obtain magnetic field information periodically (e.g., 0.1 second), by using the magnetic sensor 151. The first device 100 may obtain magnetic field information via the magnetic sensor 151 when a movement of the first device 100 is detected. When the first device 100 is located at a pre-set area (e.g., a house or office), the magnetic field information may be obtained via the magnetic sensor 151. When the first device 100 obtains the magnetic field information via the magnetic sensor 151, the first device 100 may consider angular velocity information detected by a gyroscope and acceleration information detected by an accelerometer sensor. When the value of the magnetic sensor 151 is measured, the first device 100 may be in motion, so that the first device 100 may further consider the angular velocity information and the acceleration information so as to obtain accurate magnetic field information.

The first device 100 may compare the magnetic field information obtained via the magnetic sensor 151 with pre-set reference magnetic field information. The first device 100 may determine whether a value of the magnetic field information obtained via the magnetic sensor 151 is equal to or greater than a value of the reference magnetic field information.

The reference magnetic field information according to the present embodiment may be information about the intensity of a magnetic field, a magnetic force, or a critical value that is a reference for switching an inactive state of a communication unit into an active state. For example, the reference magnetic field information may be set to 180 μT. The reference magnetic field information may be set by a user, the first device 100, or an external server.

in response to the magnetic field information obtained via the magnetic sensor 151 being less than the value of the reference magnetic field information (e.g., 180 μT), the first device 100 may continuously monitor magnetic field information of its vicinity via the magnetic sensor 151 while the first device 100 maintains its communication unit in an inactive state.

As illustrated in FIG. 10(*b*), when the value of the magnetic field information obtained via the magnetic sensor 151 is equal to or greater than the value of the reference magnetic field information, the first device 100 may scan the second device 200 by using at least one communication unit. For example, the first device 100 may receive, via the BLE communication unit, information (e.g., speaker's voice information, communication connection information of the second device 200, for example) that is broadcast by the second device 200. The first device 100 may recognize the second device 200 by analyzing the information. The first device 100 performs a BLE scan only when the second device 200 that includes a magnetic substance (e.g., a speaker) is around the first device 100, and thus, the first device 100 may reduce power consumption.

Figure 11A:
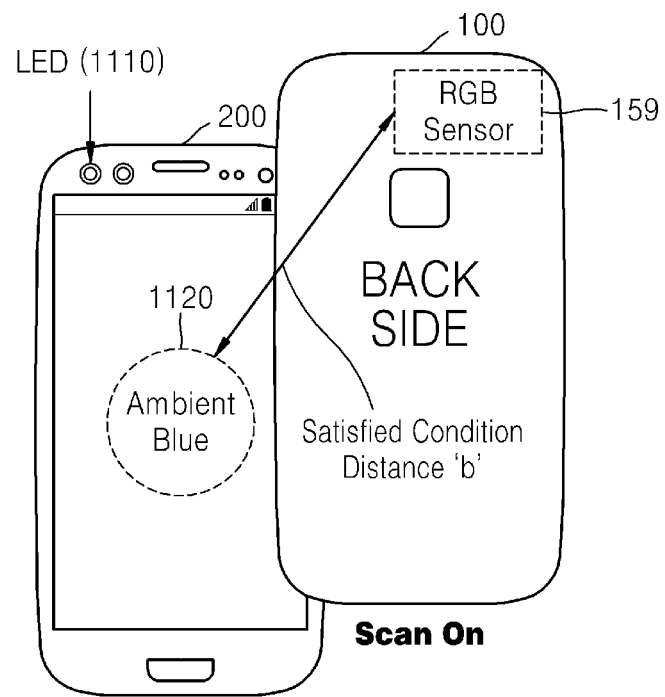
FIG. 11A and FIG. 11B illustrate a first device scanning a second device based on a value of an RGB sensor, according to invention principles.
Figure 11B:
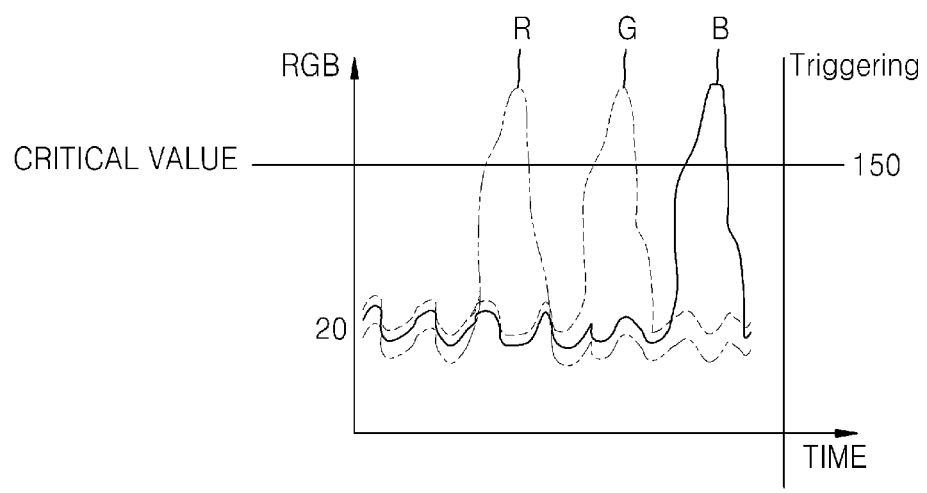

FIG. 11 illustrates an example in which the first device 100 scans the second device 200 based on a value of an RGB sensor.

The mobile terminal that is the second device 200 may include a light-emitting diode (LED) or a display unit that displays an image.

As illustrated in FIG. 11(*a*), the first device 100 may obtain color information via an RGB sensor 159. The RGB sensor 159 may indicate a sensor for detecting a color (such as ambient blue 1120) emitted from a light source. When a light sensor is to analyze the three primary colors of light, the RGB sensor 159 may be a light sensor.

The color information may include, but is not limited to, a color (e.g., red, green, blue, white), a color intensity value (e.g., between about 0 and about 255) and color pattern information, for example.

The first device 100 may compare the color information obtained via the RGB sensor 159 with pre-set reference color information. For example, the first device 100 may determine a similarity between the color information obtained via the RGB sensor 159 and the pre-set reference color information.

The reference color information may be information about the color (e.g., blue, green, red, white), information about the color intensity value (e.g., between about 0 and about 255), or the color pattern information. For example, the reference color information may be a pattern in which a color change value is greater than or equal to a critical value in the order of red, green, and blue.

The reference color information may be set by a user, the first device 100, or an external server. The first device 100 may extract the reference color information from the memory and may compare the extracted reference color information with the color information obtained via the RGB sensor 159. When a similarity between the color information obtained via the RGB sensor 159 with the reference color information that may change in order of, for example, red→green→blue, is less than a predetermined value (e.g., 90%), the first device 100 may continuously monitor color information in its vicinity via the RGB sensor 159 while the first device 100 maintains its communication unit in an inactive state. As illustrated in FIG. 11(*b*), when the similarity between the color information obtained via the RGB sensor 159 and the reference color information is equal to or greater than a predetermined value (e.g., 90%), the first device 100 may scan the second device 200 by using at least one communication unit. For example, when the similarity between the color information obtained via the RGB sensor 159 and the reference color information is equal to or greater than the predetermined value (e.g., 90%), the first device 100 may determine that a predetermined event related to a device scan occurs. When the second device 200 broadcasts speaker's voice information and communication connection information of the second device 200, the second device 200 may output light via the display unit (e.g., an LED). In this case, the first device 100 may obtain the color information via the RGB sensor 159. When the color information obtained via the RGB sensor 159 that may change in order of, for example, red→green→blue, matches the reference color information that may change in order of, for example, red→green→blue, the first device 100 may switch a state of the communication unit from the inactive state to an active state. The first device 100 may receive, via the communication unit switched to the active state, the speaker's voice information and the communication connection information of the second device 200 that are broadcast by the second device 200.

Figure 12:
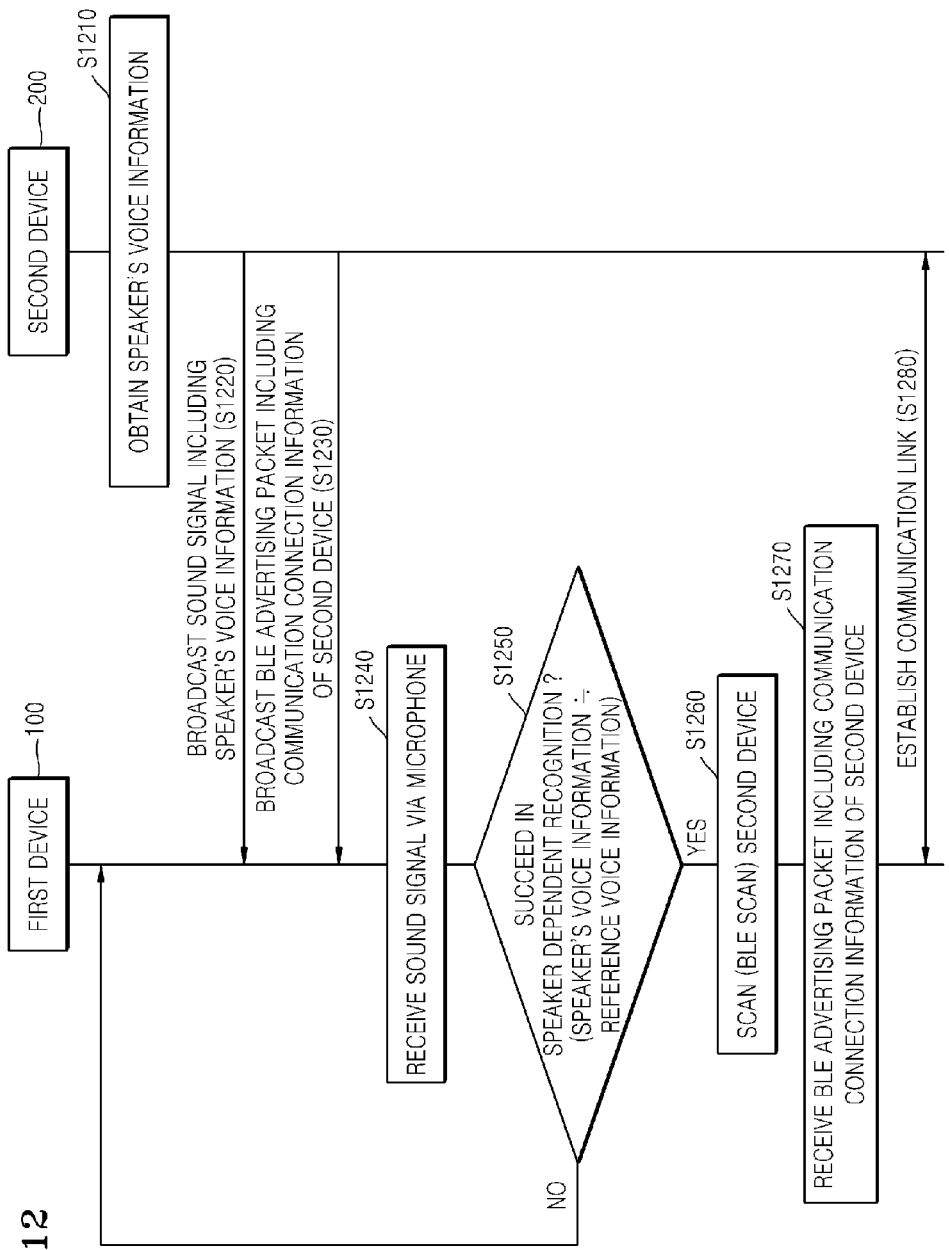
FIG. 12 is a flowchart of a method of establishing, by the first device and the second device, a communication link for exchanging data via sound communication and BLE communication, according to invention principles.

FIG. 12 is a flowchart of a method of establishing, by the first device 100 and the second device 200, a communication link for exchanging data via sound communication and BLE communication, according to invention principles.

In operation S1210, the second device 200 may obtain speaker's voice information. Since operation S1210 corresponds to operation S810 of the flowchart shown in FIG. 8, detailed descriptions thereof are omitted here.

In operation S1220, the second device 200 may broadcast a sound signal including the speaker's voice information. In operation S1230, the second device 200 may broadcast an advertising packet including communication connection information of the second device 200 via the BLE communication. Operations S1220 and S1230 may be concurrently or sequentially performed. Alternatively, operation S1230 may be performed before operation S1220.

In operation S1240, the first device 100 may receive the sound signal via its microphone. In operation S1250, the first device 100 may perform speaker dependent recognition based on the speaker's voice information included in the sound signal. This process is described below with reference to FIG. 13.

Figure 13A:
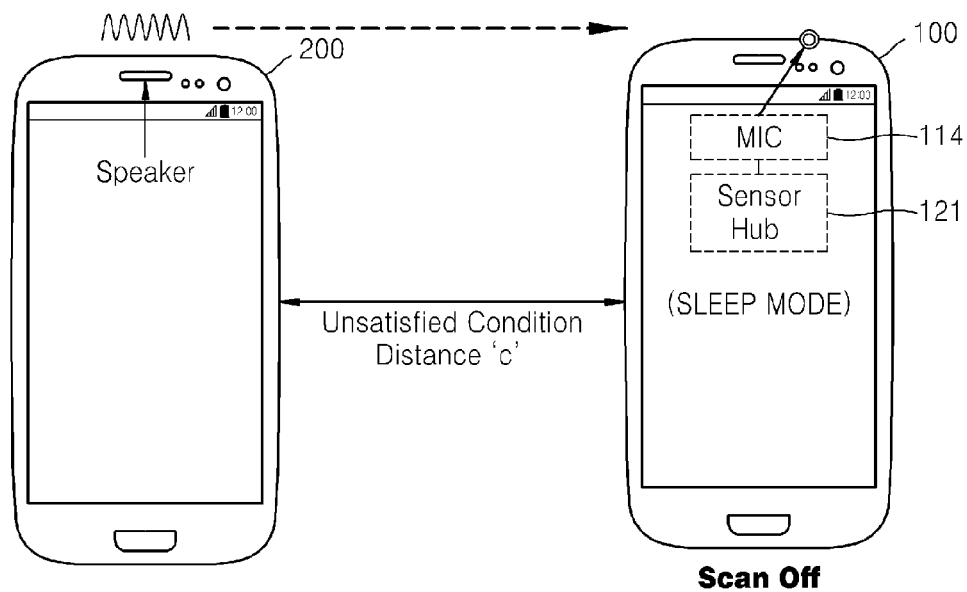
FIG. 13A and FIG. 13B are a first device scanning the second device based on speaker dependent recognition, according to invention principles.
Figure 13B:
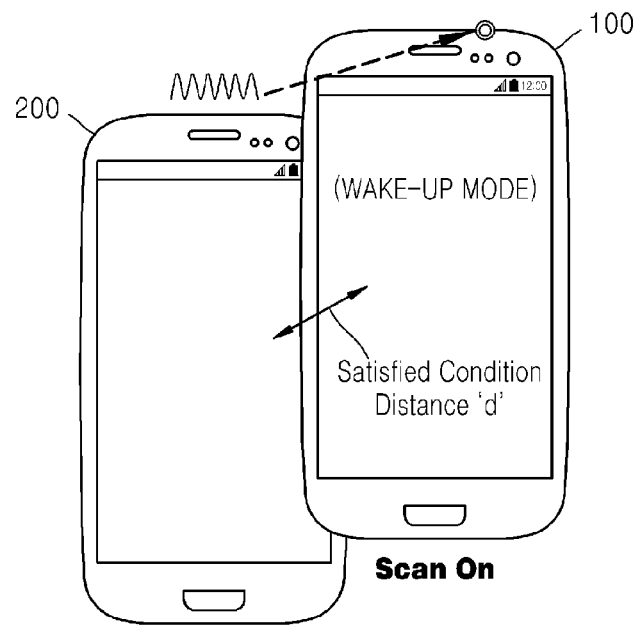

As illustrated in FIG. 13(*a*), a microphone 114 of the first device 100 may be connected to a sensor hub 121 and may remain active. In this case, the sensor hub 121 may obtain, via the microphone 114, the speaker's voice information included in the sound signal that is broadcast by the second device 200. The sensor hub 121 may compare reference voice information with the speaker's voice information. For example, the sensor hub 121 may determine whether a similarity between the reference voice information and the speaker's voice information is equal to or greater than a predetermined value (e.g., about 97%). When the similarity between the reference voice information and the speaker's voice information is less than the predetermined value (e.g., about 97%), the first device 100 may continuously monitor sound information of its vicinity via the microphone 114 while the first device 100 maintains its communication unit in an inactive state.

As illustrated in FIG. 13(*b*), when the similarity between the reference voice information and the speaker's voice information obtained via the microphone 114 is equal to or greater than the predetermined value (e.g., about 97%), the first device 100 may switch a mode of at least one communication unit to an active state.

In operation S1260, the first device 100 may scan the second device 200. For example, when the first device 100 succeeds in performing the speaker dependent recognition (i.e., when the similarity between the reference voice information and the speaker's voice information is equal to or greater than the predetermined value (e.g., about 97%)), the first device 100 may switch a mode of the BLE communication unit to an active state. The first device 100 may scan the second device 200 by using the BLE communication unit in the active state. The first device 100 performs a BLE scan when the first device 100 succeeds in performing the speaker dependent recognition, and thus, the first device 100 may not waste power. In operation S1270, the first device 100 may receive the advertising packet that is broadcast by the second device 200. In operation S1280, the first device 100 may establish a bidirectional communication link with the second device 200 by using the communication connection information of the second device 200, which is included in the advertising packet.

The communication link may be established by using the same communication method as a communication method by which the first device 100 receives advertisement information that is broadcast by the second device 200, or may be established by using a communication method (i.e., the OOB method) different from the communication method of receiving advertisement information. Hereinafter, a process in which the first device 100 establishes the communication link by using the OOB method will now be described in detail with reference to FIG. 14.

Figure 14B:
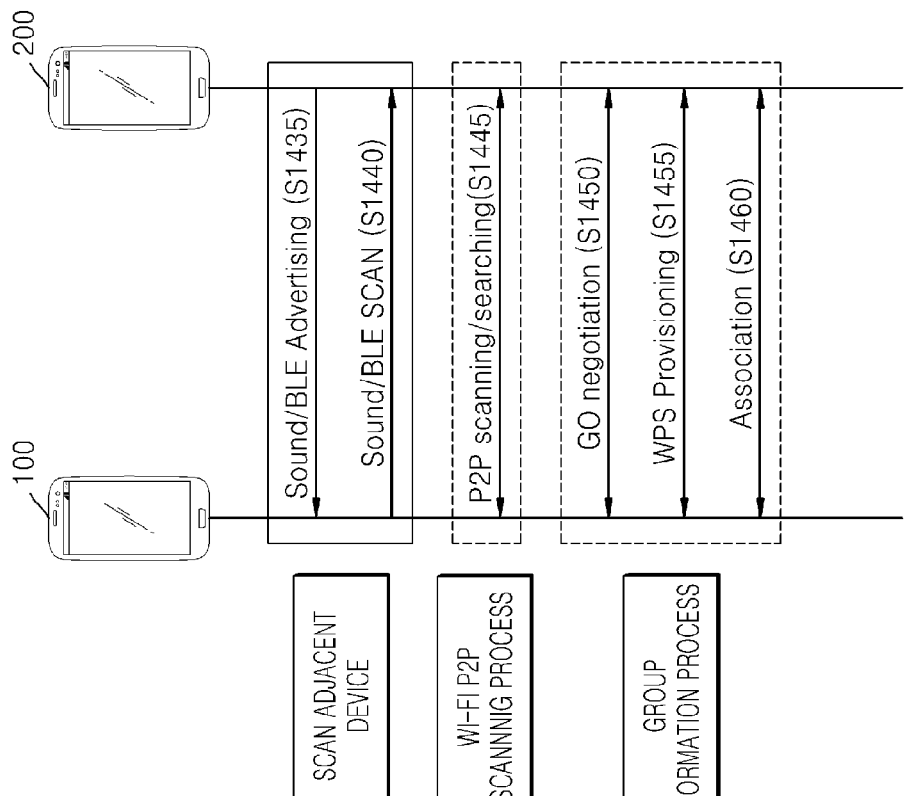
FIG. 14A and FIG. 14B are flowcharts of a method of establishing, by the first device and the second device, a communication link by using an out-of-band (OOB) method, according to invention principles.
Figure 14A:
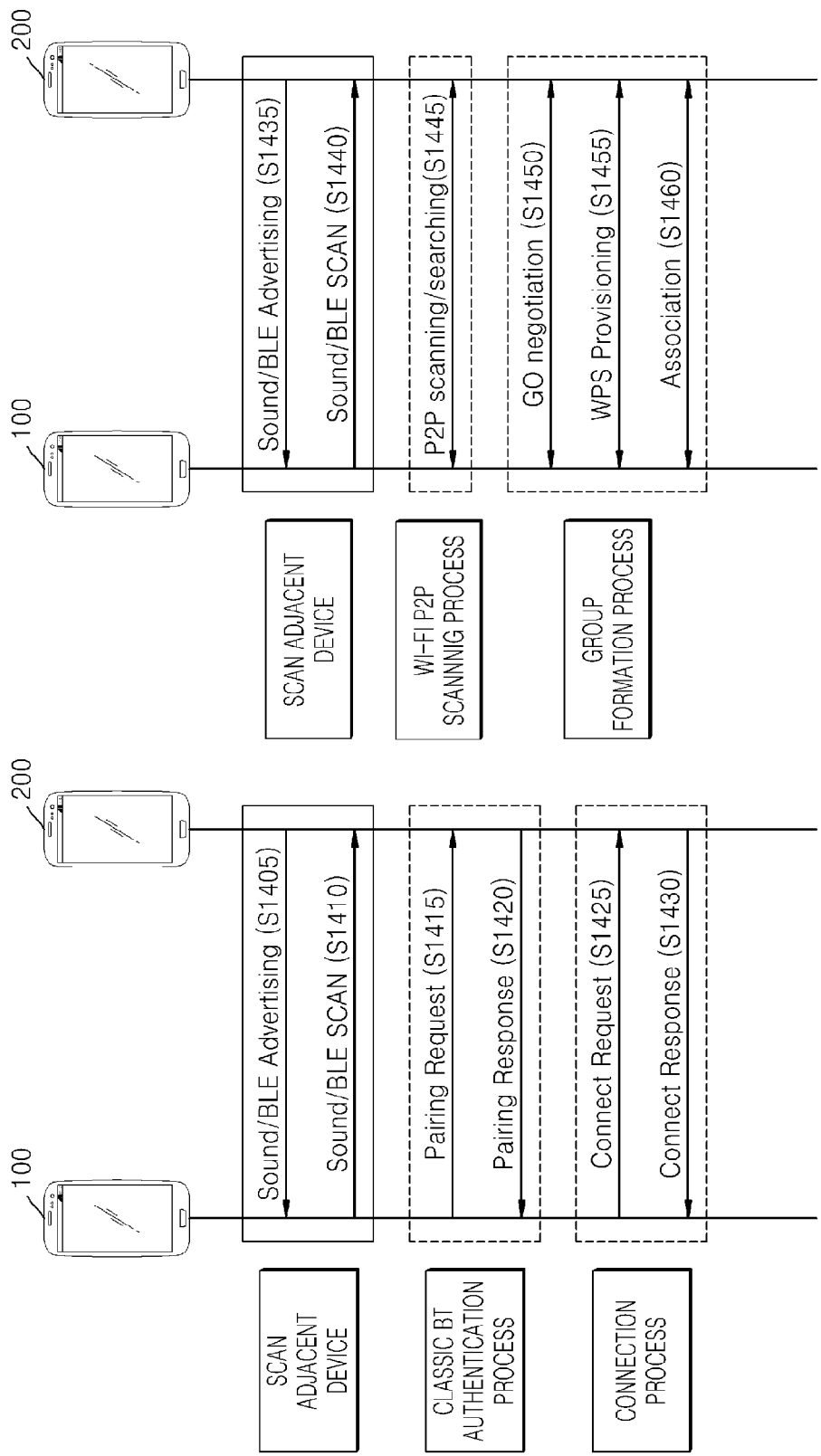

FIG. 14 shows a process flow of a method of establishing, by the first device 100 and the second device 200, a communication link by using the OOB method, according to invention principles. As illustrated in FIG. 14(*a*), the first device 100 and the second device 200 may establish a Bluetooth communication link.

In operation S1405, the second device 200 may broadcast a sound signal and/or an advertising packet, which includes speaker's voice information and communication connection information of the second device 200, by using the sound output unit and/or the BLE communication unit. In operation S1410, the first device 100 may scan the second device 200 by using the microphone or the BLE communication unit. The first device 100 and the second device 200 may establish a sound communication link or a BLE communication link as a first communication link. The first device 100 may determine a Bluetooth communication method as a second communication method to exchange data via the first communication link. In operation S1415, the first device 100 may transmit a pairing request to the second device 200. Here, 'pairing' is a process of checking a password, ID information, security information, authorization information, for example, which are set for mutual communication connection between the first device 100 and the second device 200 that support a Bluetooth function.

In operation S1420, the first device 100 may receive a pairing response. The second device 200 in response to the pairing request may transmit personal ID information to the first device 100. An example of the personal ID information may be a personal identification number (PIN) code. The personal ID information may be created just for a single use or stored in the memory. When personal ID information requested by the first device 100 matches the personal ID information received from the second device 200, the pairing between the first device 100 and the second device 200 may be completed.

In operation S1425, the first device 100 may transmit a Bluetooth connection request to the second device 200. In operation S1430, the second device 200 may respond to the connection request by the first device 100. In this case, the first device 100 may establish a Bluetooth communication link with the second device 200. Since the process of establishing a Bluetooth communication link is a well-known, detailed descriptions thereof are omitted here.

As illustrated in FIG. 14(*b*), both of the first device 100 and the second device 200 may establish a WFD communication link. Operations S1435 and S1440 may correspond to operations S1405 and S1410, respectively. For example, the first device 100 and the second device 200 may establish a sound communication link or a BLE communication link as the first communication link. The first device 100 may determine a WFD communication method as the second communication method to exchange data via the first communication link. In operation S1445, the first device 100 may scan the second device 200 that includes a WFD function. When the second device 200 is scanned, the first device 100 may be connected to the second device 200 through forming of a group (one-to-one or one-to-many topology). In operation S1450, the first device 100 may perform the forming of a group with the second device 200. The first device 100 and the second device 200 may negotiate so as to determine a peer-to-peer group owner (P2P GO) and a P2P client that may serve major roles of a group, and may set an operating channel to be used in the group. In operation S1455, the first device 100 and the second device 200 may perform a Wi-Fi protected setup (WPS). For example, the first device 100 and the second device 200 may exchange PIN information that is input by a device user via a keypad, and may perform a setup according to push button selection by a user. In operation S1460, the first device 100 and the second device 200 may establish a WFD communication link. Since the process of establishing a WFD communication link is a well-known technology, detailed descriptions thereof are omitted here.

Figure 15:
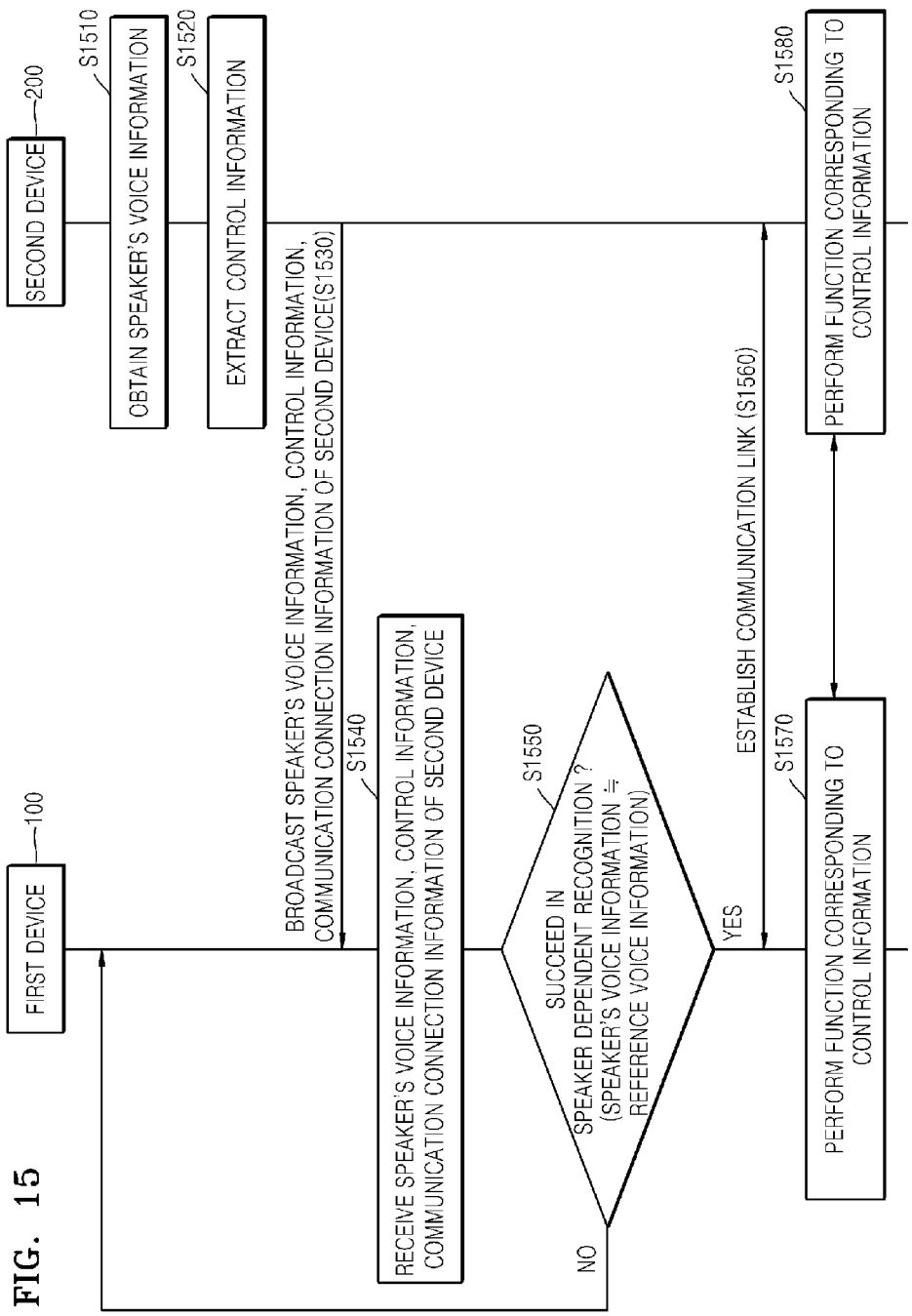
FIG. 15 is a flowchart of a method, performed by the second device, of extracting control information from speaker's voice information and performing a function that corresponds to the control information, according to invention principles.

FIG. 15 is a flowchart of a method, performed by the second device 200, for extracting control information from speaker's voice information and performing a function that corresponds to the control information.

In operation S1510, the second device 200 may obtain speaker's voice information. Since operation S1510 corresponds to operation S810 of the flowchart shown in FIG. 8, detailed descriptions thereof are omitted here.

In operation S1520, the second device 200 may extract control information from the speaker's voice information. The control information may include a command to control at least one of the first device 100 and the second device 200. For example, the control information may include at least one of a control command to receive content, a control command to transmit content, a control command to transmit position information, a control command to synchronize a plurality of pieces of data, a control command to switch a mode, and a control command to perform screen-mirroring. The second device 200 may compare the speaker's voice information with a DB including commands, thereby extracting the control information included in the speaker's voice information. Since operation S1520 corresponds to operation S330 of the flowchart shown in FIG. 3, detailed descriptions thereof are omitted here. In operation S1530, the second device 200 may broadcast the speaker's voice information, the control information, and communication connection information of the second device 200. The second device 200 may broadcast the speaker's voice information, the control information, and the communication connection information of the second device 200 via sound communication (e.g., by using at least one of an inaudible range or an audible range of a sound signal) and short range communication (e.g., BLE communication, Ant+ communication, NFC communication, for example). Descriptions about a method, performed by the second device 200, of broadcasting the advertisement information, are the same as descriptions about operation S220 of the flowchart shown in FIG. 2, and thus are omitted here.

In operation S1540, the first device 100 may receive the speaker's voice information, the control information, and the communication connection information of the second device 200 from the second device 200. For example, the first device 100 may receive the speaker's voice information, the control information, and the communication connection information of the second device 200 via the microphone or the BLE communication unit.

In operation S1550, the first device 100 may perform speaker dependent recognition based on the speaker's voice information. For example, the first device 100 may determine whether a similarity between the speaker's voice information and reference voice information is equal to or greater than a predetermined value (e.g., about 97%).

In operation S1560, when the first device 100 succeeds in performing the speaker dependent recognition (i.e., when the similarity between the reference voice information and the speaker's voice information is equal to or greater than the predetermined value (e.g., about 97%)), the first device 100 may establish a communication link with the second device 200 based on the communication connection information of the second device 200. In operation S1570, the first device 100 may perform a function that corresponds to the control information received from the second device 200. For example, the first device 100 may prepare to receive predetermined content via the communication link. When the first device 100 receives the predetermined content from the second device 200, the first device 100 may display the predetermined content on a screen. Also, the first device 100 may transmit content, which is requested by the second device 200, to the second device 200 via the communication link. In operation S1580, the second device 200 may perform a function corresponding to the control information that is extracted from the speaker's voice information, via the communication link. For example, the second device 200 may transmit the predetermined content, which is selected by a speaker, to the first device 100 via the communication link. Also, the second device 200 may receive content from the first device 100 via the communication link.

In an embodiment, the first device 100 may extract control information from speaker's voice information that is transmitted by the second device 200, and the first device 100 may transmit the extracted control information to the second device 200. Alternatively, each of the first device 100 and the second device 200 may extract control information from speaker's voice information.

Figure 16C:
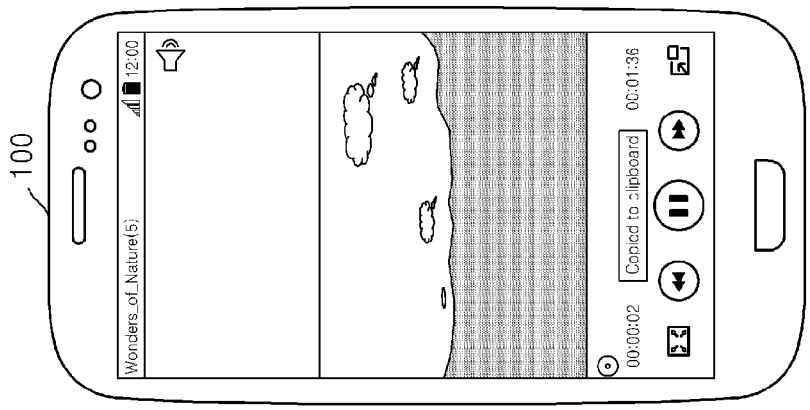
FIG. 16A, FIG. 16B and FIG. 16C show the first device and the second device performing a function associated with control information, according to invention principles.
Figure 16B:
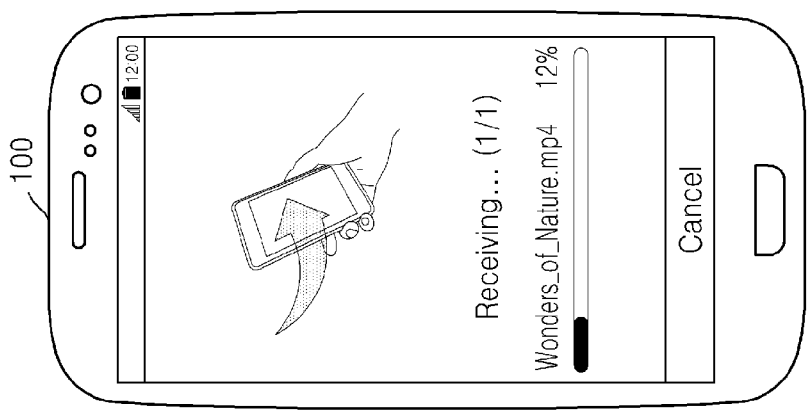
Figure 16A:
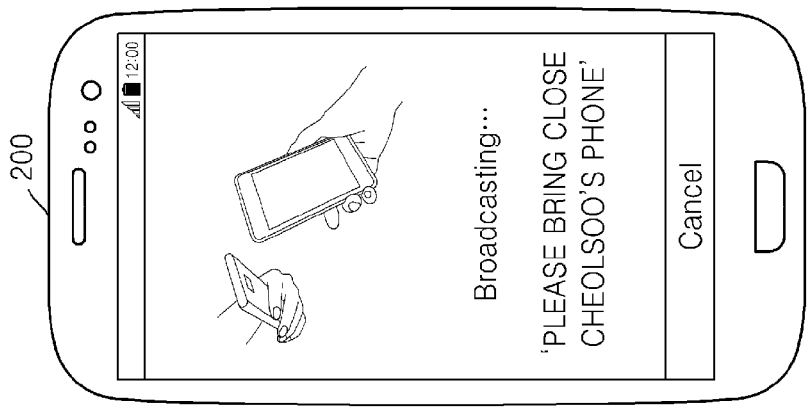

Hereinafter, an example in which the first device 100 and the second device 200 perform a control command included in a speaker's voice via a communication link will now be described in detail with reference to FIG. 16. FIG. 16 illustrates an example in which the first device 100 and the second device 200 perform a function that corresponds to control information. As illustrated in FIG. 16(*a*), when a user of the first device 100 inputs a voice of 'Cheolsoo's phone, receive' into the second device 200, the second device 200 may broadcast voice information about the voice of 'Cheolsoo's phone, receive' that is input by the user of the first device 100, and communication connection information of the second device 200. Here, the first device 100 may extract control information indicating 'receive' from the voice of 'Cheolsoo's phone, receive' that is input by the user, and may transmit the control information indicating 'receive' to the second device 200. The first device 100 may perform speaker dependent recognition based on the voice information received from the second device 200. Since a pre-set expression ('Cheolsoo's phone') said by the voice of the user of the first device 100 is input, the speaker dependent recognition may succeed. In this case, the first device 100 may establish a communication link with the second device 200 based on the communication connection information of the second device 200.

As illustrated in FIG. 16(*b*), when the second device 200 receives the voice of 'Cheolsoo's phone, receive', the second device 200 may interpret the control information indicating 'receive' as a control command to transmit currently-reproduced content to the first device 100. Thus, the second device 200 may check content information about the currently-reproduced content and may transmit a data share request including the content information to the first device 100. The content information may include, but is not limited to, a content type, a content ID value, a content size, and content metadata. When the first device 100 transmits an acceptance message with respect to the data share request to the second device 200, the second device 200 may transmit the content to the first device 100. Here, the first device 100 may prepare to receive the content, based on the control information indicating 'receive' and the content information that are transmitted by the second device 200, and may receive the content from the second device 200. When the first device 100 receives the data share request, the first device 100 may display, on its screen, information about the second device 200 or a transmitter, the content information, and a GUI including items "Accept", "Ignore", for example, requesting a user to confirm whether or not to receive content.

As illustrated in FIG. 16(*c*), when the speaker dependent recognition succeeds, the first device 100 may switch a screen lock mode to a screen unlock mode. Thus, although the first device 100 does not receive a separate input from the user, the first device 100 may display the content from the second device 200 on the screen or may reproduce the content. A speaker may transmit content that is reproduced in the second device 200 to the first device 100 by vocally input of a predetermined expression to the second device 200.

Figure 17:
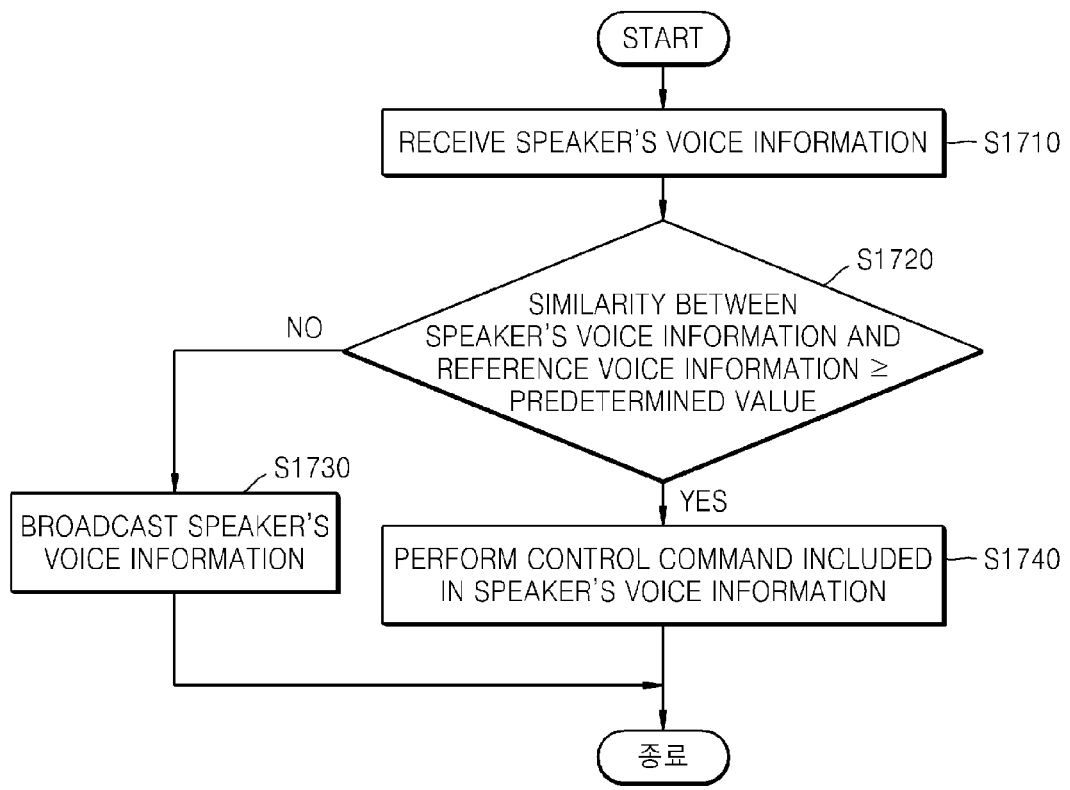
FIG. 17 is a flowchart of a method of broadcasting voice information when the first device fails to perform speaker dependent recognition, according to invention principles.

FIG. 17 is a flowchart of a method of broadcasting speaker's voice information when the first device 200 fails to perform speaker dependent recognition. In operation S1710, the first device 100 may receive speaker's voice information. For example, a microphone of the first device 100 may be connected to a sensor hub of the first device 100 and may remain active. The sensor hub of the first device 100 may obtain, via the microphone, the speaker's voice information included in a sound signal that is broadcast. In another embodiment, when at least one short range communication unit is connected to the sensor hub of the first device 100 and transits to an active state, the first device 100 may obtain speaker's voice information that is broadcast, by using the at least one short range communication unit. In operation S1720, the first device 100 may determine whether a similarity between the speaker's voice information and predetermined reference voice information is equal to or greater than a predetermined value. For example, the sensor hub of the first device 100 may transmit an indication of whether the similarity between the speaker's voice information and the reference voice information is equal to or greater than the predetermined value (e.g., about 97%).

In operation S1730, when the similarity between the speaker's voice information and the reference voice information is less than the predetermined value, the first device 100 may broadcast the received broadcast speaker's voice information. For example, the first device 100 may broadcast a sound signal including the speaker's voice information by using the sound output unit. Also, the first device 100 may broadcast the speaker's voice information via short range communication (e.g., BLE communication, for example).

In operation S1740, when the similarity between the speaker's voice information and the reference voice information is equal to or greater than the predetermined value, the first device 100 may perform a control command included in the speaker's voice information. For example, when a pre-trained expression spoken by a pre-trained speaker's voice, is input, the first device 100 may perform the control command (e.g., to form a communication link, to transmit current position information) that is included in the speaker's voice information.

The first device 100 may extract the control command from the speaker's voice information. Also, the first device 100 may receive the speaker's voice information and the control command that is extracted from the speaker's voice information. When the speaker's voice information from the outside matches the reference voice information, the first device 100 may recognize that a final destination of the speaker's voice information is the first device 100. Thus, the first device 100 no longer broadcasts the speaker's voice information and may perform the control command included in the speaker's voice information.

When the received broadcast speaker's voice information does not match the reference voice information, the first device 100 may recognize that the final destination of the speaker's voice information is not the first device 100. Thus, the first device 100 may re-broadcast the speaker's voice information to the outside. This process will now be described in detail with reference to FIG. 18.

Figure 18:
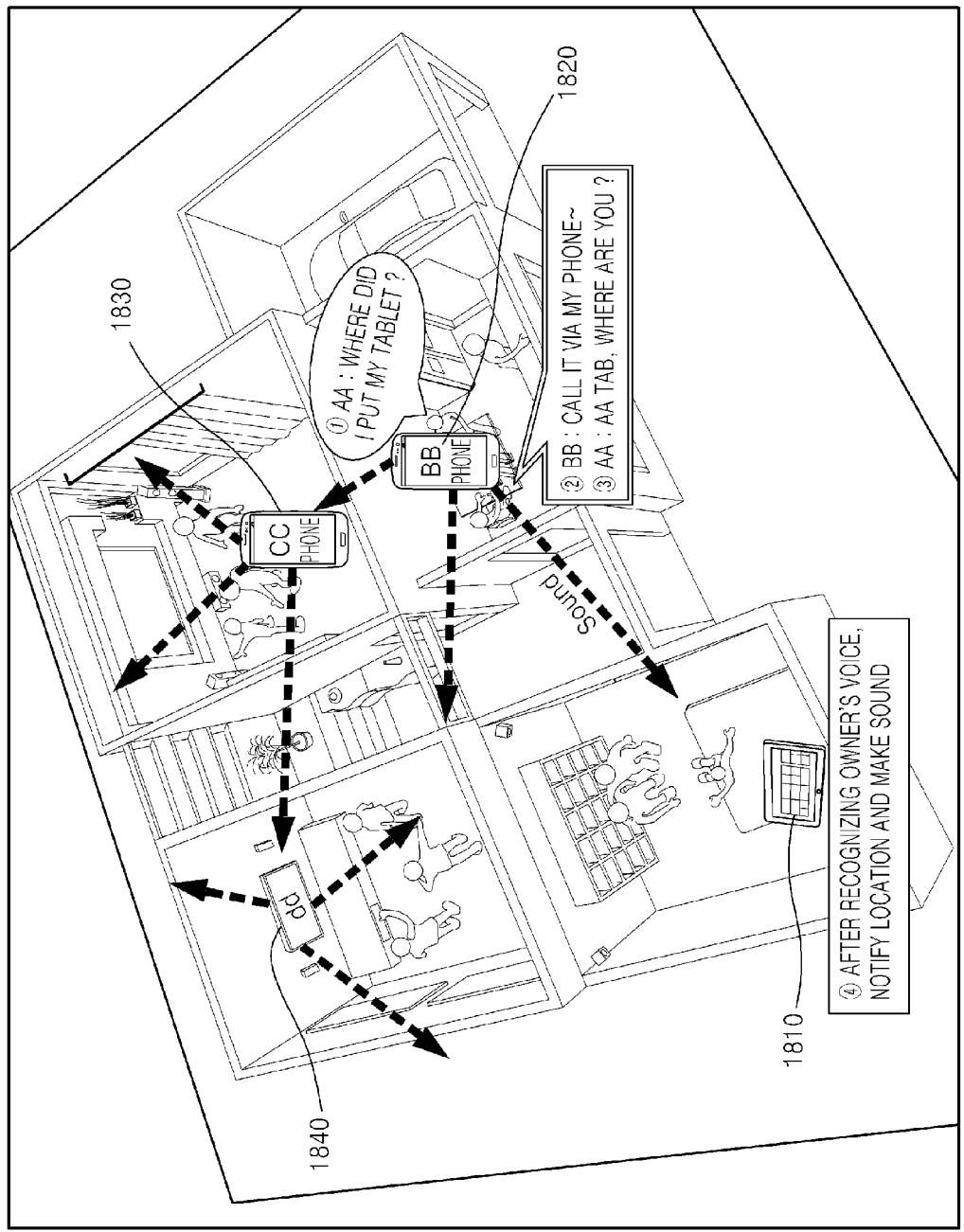
FIG. 18 illustrates a speaker searching for a particular device by using voice information according to invention principles.

FIG. 18 illustrates an example in which a speaker searches for a particular device by using voice information. A first user AA may not exactly know where a tablet PC 1810 of the first user AA is located. In this case, the first user AA may input a voice of "AA tab, where are you?" to a mobile phone 1820 of a second user BB near the first user AA. Here, the AA tab may be a name of the tablet PC 1810 and may be first reference voice information that is trained to the tablet PC 1810 by the first user AA. The mobile phone 1820 of the second user BB may broadcast the voice of "AA tab, where are you?" or a sound signal including feature information about the voice of "AA tab, where are you?". Here, the mobile phone 1820 of the second user BB may use an inaudible range or an audible range of the sound signal.

A mobile phone 1830 of a third user CC may receive, via a microphone of the mobile phone 1830, the sound signal including voice information indicating "AA tab, where are you?" that is broadcast by the mobile phone 1820 of the second user BB. Since the AA tab does not match third reference voice information (e.g., 'CC phone') that is trained to the mobile phone 1830 by the third user CC, the mobile phone 1830 of the third user CC may determine that a final destination of the voice information is not the mobile phone 1830. Thus, the mobile phone 1830 of the third user CC may re-broadcast the sound signal including the voice information indicating "AA tab, where are you?" by using its sound output unit. A TV 1840 of a fourth user dd may receive, via its microphone, the sound signal including the voice information indicating "AA tab, where are you?" that is broadcast by the mobile phone 1830 of the third user CC. Since the AA tab does not match fourth reference voice information (e.g., 'dd TV') that is trained to the TV 1840 by the fourth user dd, the TV 1840 of the fourth user dd may determine that the final destination of the voice information is not the TV 1840. Thus, the TV 1840 of the fourth user dd may re-broadcast the sound signal including the voice information indicating "AA tab, where are you?" by using its sound output unit. The tablet PC 1810 of the first user AA may receive, via its microphone, the sound signal including the voice information indicating "AA tab, where are you?" that is broadcast by the mobile phone 1820 of the second user BB or the TV 1840 of the fourth user dd. Since the AA tab matches the first reference voice information (i.e., 'AA tab') that is trained to the tablet PC 1810 by the first user AA, the tablet PC 1810 of the first user AA may determine that the final destination of the voice information is the tablet PC 1810.

Thus, the tablet PC 1810 of the first user AA no longer broadcasts the voice information indicating "AA tab, where are you?" and may perform a control command included in the voice information. For example, when control information indicating "where are you?" corresponds to a command 'to transmit its current location or to output an alarm signal', the tablet PC 1810 may transmit its position information or may output an alarm signal to inform its location to the mobile phone 1820 of the second user BB.

In the example of FIG. 18, the sound signal including the voice information is relayed between devices of different users. However, in another embodiment, a sound signal including voice information may be relayed between devices of the same user. For example, when a first user vocally inputs voice information indicating "Watch, where are you?" to a mobile phone of the first user, the voice information indicating "Watch, where are you?" may be relayed to a watch of the first user from the mobile phone of the first user via a TV of the first user and a camera of the first user. Thus, although there is a limit in a distance within which a sound signal may be delivered via a sound output unit (e.g., a speaker), voice information may be delivered to a distant destination via relay transmission of a sound signal between devices.

Figure 19:
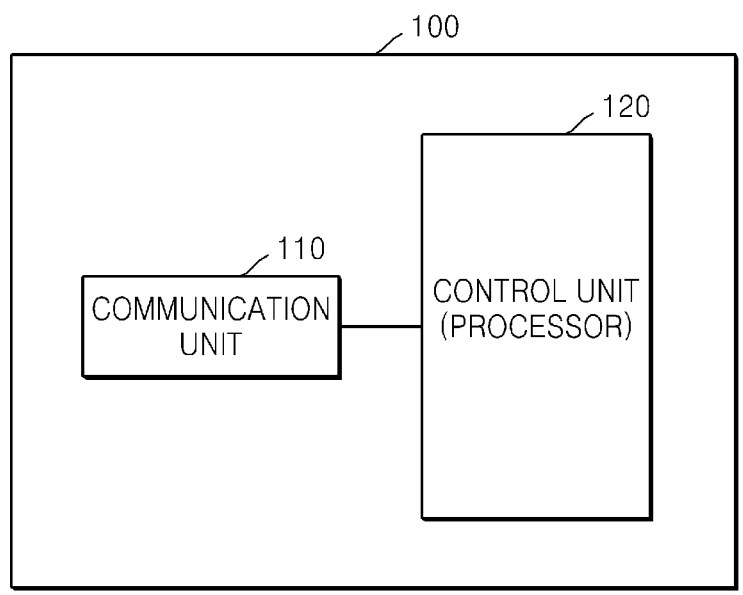
FIG. 19 and FIG. 20 show a structure of the first device according to embodiments of the present invention according to invention principles.
Figure 20:
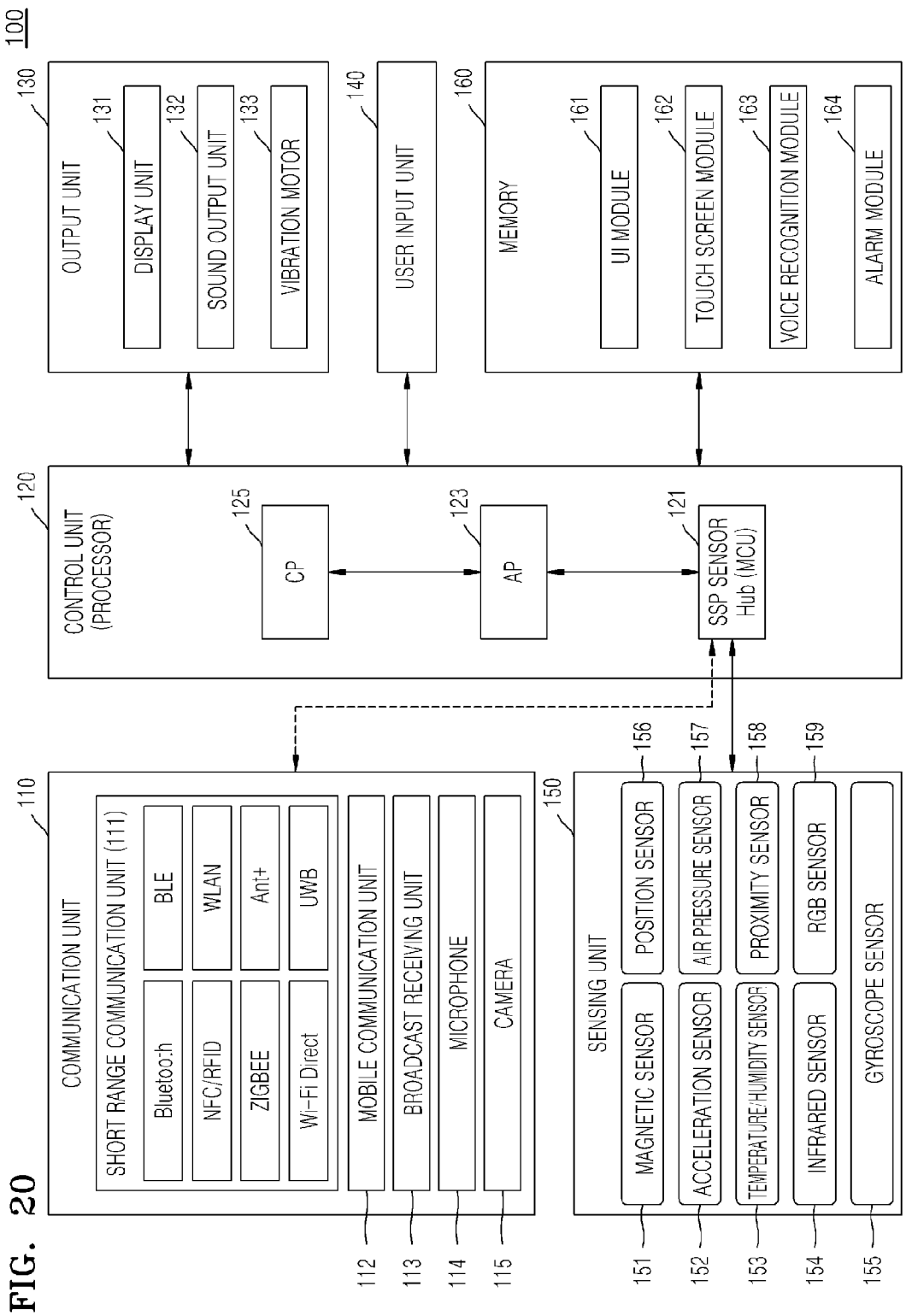

FIGS. 19 and 20 show a structure of the first device 100. Referring to FIG. 19, the first device 100 may include a communication unit 110 and a control unit 120 (hereinafter, the processor 120).

As illustrated in FIG. 20, the first device 100 may further include an output unit 130, a user input unit 140, a sensing unit 150, and a memory 160 in addition to the communication unit 110 and the processor 120. The communication unit 110 may include one or more elements allowing communication between the first device 100 and the second device 200 or between the first device 100 and a server. For example, the communication unit 110 may include a short range communication unit 111, a mobile communication unit 112, a broadcast receiving unit 113, a microphone 114, and a camera 115. The short range communication unit 111 may include, but is not limited thereto, a Bluetooth communication unit, a BLE communication unit, an NFC/RFID unit, a Wi-Fi communication unit, a ZigBee communication unit, an IrDA communication unit, a WFD communication unit, a UWB communication unit or an Ant+ communication unit for example. The short range communication unit 111 may receive speaker's voice information and communication connection information of the second device 200 that are broadcast by the second device 200. When a predetermined event occurs, the short range communication unit 111 may scan the second device 200 and may receive the speaker's voice information and the communication connection information of the second device 200. An example of the predetermined event may include, but is not limited to, an event in which a value of magnetic field information obtained via a magnetic sensor 151 becomes equal to or greater than a value of pre-set reference magnetic field information, an event in which color information obtained via the RGB sensor 159 matches reference color information, and an event in which sound information obtained via the microphone 114 matches reference sound information.

The short range communication unit 111 may receive control information, which is extracted from the speaker's voice information, from the second device 200. The short range communication unit 111 may transmit received data to the processor 120. The short range communication unit 111 may be connected to the sensor hub 121. The mobile communication unit 112 exchanges a wireless signal with at least one of a base station, an external terminal, and a server on a mobile communication network. The wireless signal may include various types of data according to communication of a sound call signal, a video call signal, or a text/multimedia message. The broadcast receiving unit 113 receives a broadcast signal and/or information related to broadcast from the outside through a broadcast channel. The broadcast channel may include a satellite channel and a ground wave channel. The first device 100 may not include the broadcast receiving unit 113. The microphone 114 receives an input of an external sound signal and processes the received sound signal into electrical sound data. For example, the microphone 114 may receive a sound signal transmitted by the second device 200. The sound signal transmitted by the second device 200 may include, but is not limited to, the speaker's voice information obtained via a microphone of the second device 200, ID information of the second device 200, state information of the second device 200, and information about a communication method supported by the second device 200. For example, the sound signal may include control information that is extracted from the speaker's voice information. The microphone 114 may transmit the processed sound data to the processor 120. According to the present embodiment, the microphone 114 may be connected to the sensor hub 121.

The camera 115 may obtain an image frame such as a still image or a moving picture via an image sensor in a video call mode or a photographing mode. An image captured via the image sensor may be processed by the processor 120 or a separate image processing unit (not shown). For example, the camera 115 may recognize a one-dimensional barcode, a two-dimensional barcode, for example a QR code, a three-dimensional barcode, a color code, a gray code, which are displayed on the screen of the second device 200.

The communication unit 110 may transmit a communication connection request to the second device 200, based on the communication connection information of the second device 200. The communication unit 110 may receive an acceptance message with respect to the communication connection request from the second device 200. The communication unit 110 may receive content from the second device 200 via a communication link. The communication unit 110 may transmit content to the second device 200 via a communication link. Also, the communication unit 110 may transmit position information of the first device 100 to the second device 200. The processor 120 controls operations by the first device 100. For example, the processor 120 executes programs stored in the memory 160 so as to control the communication unit 110, the output unit 130, the user input unit 140, the sensing unit 150, the memory 160, for example. The processor 120 may compare the speaker's voice information received via the communication unit 110 with pre-stored reference voice information. When a similarity between the speaker's voice information and the reference voice information is equal to or greater than a predetermined value, the processor 120 may establish a communication link with the second device 200 by using the communication connection information of the second device 200.

When the similarity between the speaker's voice information and the reference voice information is less than the predetermined value, the processor 120 may control the communication unit 110 to broadcast the speaker's voice information to the outside.

The processor 120 may perform a function corresponding to the control information that is extracted from the speaker's voice information. The function may include at least one of a function to receive content, a function to transmit content, a function to transmit position information, a function to synchronize a plurality of pieces of data, a function to switch a mode, and a function to perform screen-mirroring. When the similarity between the speaker's voice information and the reference voice information is equal to or greater than the predetermined value, the processor 120 may switch a screen lock mode to a screen unlock mode. The processor 120 may include the sensor hub 121 of the SSP. The sensor hub 121 may be embodied by hardware or software, or be a combination of hardware and software. For example, the sensor hub 121 may include a micro-control unit (MCU). The sensor hub 121 may be connected to the sensing unit 150 and may collect sensing information from the sensing unit 150. For example, the sensor hub 121 may obtain magnetic field information detected by the magnetic sensor 151.

The sensor hub 121 may compare the magnetic field information obtained via the magnetic sensor 151 with pre-set reference magnetic field information. When the magnetic field information obtained via the magnetic sensor 151 is equal to or greater than the pre-set reference magnetic field information, the sensor hub 121 may wake up an application processor (AP) 123 from a sleep mode. While monitoring color information detected by the RGB sensor 159, the sensor hub 121 may switch the sleep mode of the AP 123 to a wake-up mode when a similarity between the color information and reference color information is equal to or greater than a predetermined value (e.g., about 90%). The sensor hub 121 may be connected to the communication unit 110. While the sensor hub 121 monitors voice information that is received via the communication unit 110, when pre-trained reference voice information is received, the sensor hub 121 may wake up the AP 123 from the sleep mode. The SSP will be described below in detail with reference to FIG. 21.

The processor 120 may include the AP 123 and a communication processor (CP) 125. The AP 123 may control the execution of different applications stored in the memory 160. For example, when a value of the magnetic field information obtained via the magnetic sensor 151 is equal to or greater than a value of the pre-set reference magnetic field information, the AP 123 may switch the communication unit 110 from an inactive state to an active state. The AP 123 may switch at least one communication unit (e.g., the BLE communication unit) from an inactive state to an active state. Also, the AP 123 may demodulate the voice information received via the communication unit 110 in the active state and/or may demodulate modulated data when the communication connection information of the second device 200 is demodulated.

The output unit 130 may output an audio signal, a video signal, or a vibration signal and may include a display unit 131, a sound output unit 132, a vibration motor 133, for example. The display unit 131 displays information processed by the first device 100. For example, the display unit 131 may display a UI or a GUI related to a call when in a call mode. When the scanning of the second device 200 fails, the display unit 131 may display on the screen a message indicating the connection (or scanning) failure. Also, the display unit 131 may provide on the screen content received from the second device 200. When the display unit 131 and a touch pad form a touch screen in a layer structure, the display unit 131 may be used as an input device in addition to an output device. The display unit 131 may include at least one of a liquid crystal display, a thin film transistor-liquid crystal display, an organic light-emitting diode display, a flexible display, a 3D display, and an electrophoretic display. The first device 100 may include two or more display units according to the embodiment type of the first device 100. The two or more display units may be arranged to face each other by using a hinge.

The sound output unit 132 outputs audio data received from the communication unit 110 or stored in the memory 160. Also, the sound output unit 132 outputs a sound signal related to a function (e.g., a call signal receiving sound, a message receiving sound, for example) performed by the first device 100. The sound output unit 132 may include a speaker or a buzzer, for example. The sound output unit 132 may broadcast, to the outside, a sound signal in which the speaker's voice information is inserted. For example, the first device 100 may insert the speaker's voice information into an inaudible range or an audible range of the sound signal and may broadcast the sound signal to which the speaker's voice information is inserted. The vibration motor 133 may output a vibration signal. For example, the vibration motor 133 may output a vibration signal corresponding to the output of audio data or video data, for example, a call signal receiving sound, a message receiving sound, for example Also, the vibration motor 133 may output a vibration signal when a touch is input to a touch screen.

The user input unit 140 is a unit via which a user inputs data to control the first device 100. For example, the user input unit 140 may be a keypad, a dome switch, a touch pad such as a capacitive overlay type, a resistive overlay type, an infrared beam type, a surface acoustic wave type, an integral strain gauge type, a piezoelectric type, for example, a jog wheel, a jog switch, for example, but one or more embodiments of the present invention are not limited thereto.

The sensing unit 150 may include at least one of the magnetic sensor 151, an acceleration sensor 152, a temperature/humidity sensor 153, an infrared sensor 154, a gyroscope sensor 155, a position sensor (e.g., GPS) 156, an air pressure sensor 157, a proximity sensor 158, and the RGB sensor (i.e., a luminance sensor) 159.

The memory 160 may store a program for processing and controlling the processor 120 or input/output data (e.g., reference voice information, reference magnetic field information, for example). The memory 160 may include a storage medium of at least one type of a flash memory, a hard disk, a multimedia card micro, a card type memory such as an SD or XD card memory, random access memory (RAM), static random access memory (SRAM), read-only memory (ROM), electrically erasable programmable read-only memory (EEPROM), programmable read-only memory (PROM), a magnetic memory, a magnetic disc, and an optical disc. Also, the first device 100 may run a web storage or a cloud server that performs a storage function of the memory 160 on the Internet.

The programs stored in the memory 160 may be classified into a plurality of modules according to their functions, for example, into a UI module 161, a touch screen module 162, a voice recognition module 163, an alarm module 164, for example. The UI module 161 may provide a specialized UI or GUI in connection with the first device 100 for each application. The touch screen module 162 may detect a user's touch gesture on the touch screen and transmit information related to the touch gesture to the processor 120. The touch screen module 162 may recognize and analyze a touch code. The touch screen module 162 may be configured by additional hardware including a controller.

Different sensors may be arranged in or near the touch screen so as to detect a touch or a proximate touch on the touch sensor. An example of the sensor to detect the touch on the touch screen may include a tactile sensor. The tactile sensor detects a contact of a specific object at least as much as a person can detect. The tactile sensor may detect different types of information such as the roughness of a contact surface, the hardness of the contact object, the temperature of a contact point, for example.

An example of the sensor to detect the touch on the touch screen may include a proximity sensor.

The proximity sensor detects the existence of an object that approaches a predetermined detection surface or that exists nearby, by using a force of an electro-magnetic field or an infrared ray, without using a mechanical contact. Examples of the proximity sensor include a transmission-type photoelectric sensor, a direction reflection-type photoelectric sensor, a mirror reflection-type photoelectric sensor, a high frequency oscillation-type proximity sensor, a capacity-type proximity sensor, a magnetic proximity sensor, an infrared-type proximity sensor, for example. The touch gesture (i.e., an input) of the user may include a tap gesture, a touch & hold gesture, a double tap gesture, a drag gesture, a panning gesture, a flick gesture, a drag & drop gesture, for example.

"Tapping" is a user's motion of touching a screen by using a finger or a touch tool such as an electronic pen and instantly lifting the finger or touch tool from the screen without moving.

"Touching & holding" is a user's motion of touching a screen by using a finger or a touch tool such as an electronic pen and maintaining the above touching motion over a critical time (e.g., 2 seconds), after touching the screen. For example, a time difference between a touch-in time and a touch-out time is greater than or equal to the critical time, for example, 2 seconds. When a touch input lasts over the critical time, in order to remind the user whether the touch input is tapping or touching & holding, a feedback signal may be provided in a visual, acoustic, or tactile manner. The critical time may vary according to an embodiment.

"Double tapping" is a user's motion of touching the screen twice by using the finger or touch tool (such as a stylus pen).

"Dragging" is a user's motion of touching the screen by using the finger or touch tool and moving the finger or touch tool to another position on the screen while keeping the touching motion. The dragging motion may enable the moving or panning motion of an object.

"Panning" is a user's motion of performing a dragging motion without selecting an object. Since no object is selected in the panning motion, no object is moved in a page but the page itself is moved on the screen or a group of objects may be moved within a page.

"Flicking" is a user's motion of performing a dragging motion over a critical speed, for example, 100 pixel/s, by using the finger or touch tool. The dragging (panning) motion or the flicking motion may be distinguished based on whether the moving speed of the finger or touch tool is over the critical speed, for example, 100 pixel/s, or not.

"Dragging & Dropping" is a user's motion of dragging an object to a predetermined position on the screen by using the finger or touch tool and dropping the object at that position.

"Pinching" is a user's motion of moving two fingers touching on the screen in opposite directions. The pinching motion is a gesture to magnify (open pinch) or contract (close pinch) an object or a page. A magnification value or a contraction value is determined according to the distance between the two fingers.

"Swiping" is a user's motion of touching an object on the screen by using the finger or touch tool and simultaneously moving the object horizontally or vertically by a predetermined distance. A swiping motion in a diagonal direction may not be recognized as a swiping event.

The memory 160 may include the voice recognition module 163 that recognizes the voice of a user by using a voice recognition engine and transmits the recognized voice to the processor 120.

The voice recognition module 163 may determine whether the speaker's voice information obtained by the first device 100 matches the pre-set reference voice information. The voice recognition module 163 may detect a recognition target period from a voice of a user, may remove a noise component and may extract a voice feature from the recognition target period. The voice recognition module 163 may compare the extracted voice feature with a voice database and may output an expression having the highest likelihood as a recognition result. When the voice recognition module 163 recognizes a sentence, not a simple command expression, the voice recognition module 163 may use a language model. The voice recognition module 163 may perform isolated word recognition, continuous speech recognition, continuous speech recognition, keyword recognition, for example. Also, the voice recognition module 163 may perform speaker independent recognition and speaker dependent recognition. The voice recognition module 163 may be embodied as hardware or software or may be embodied as combination of hardware and software. The alarm module 164 may generate a signal for notifying an occurrence of an event in the first device 100. The event occurring in the first device 100 may include, for example, a call signal reception, a message reception, a key signal input, schedule notification, for example. The alarm module 164 may output an alarm signal in the form of a video signal via the display unit 131, an alarm signal in the form of an audio signal via the sound output unit 132, or an alarm signal in the form of a vibration signal via the vibration motor 133.

The alarm module 164 may have a snooze function. For example, when a user sets an alarm repetition number (e.g., 5 times), or an alarm repetition interval (e.g., 3 minutes), the alarm module 164 may output an alarm signal a predetermined number of times (e.g., 5 times), at predetermined intervals (e.g., 3 minutes).

Figure 21:
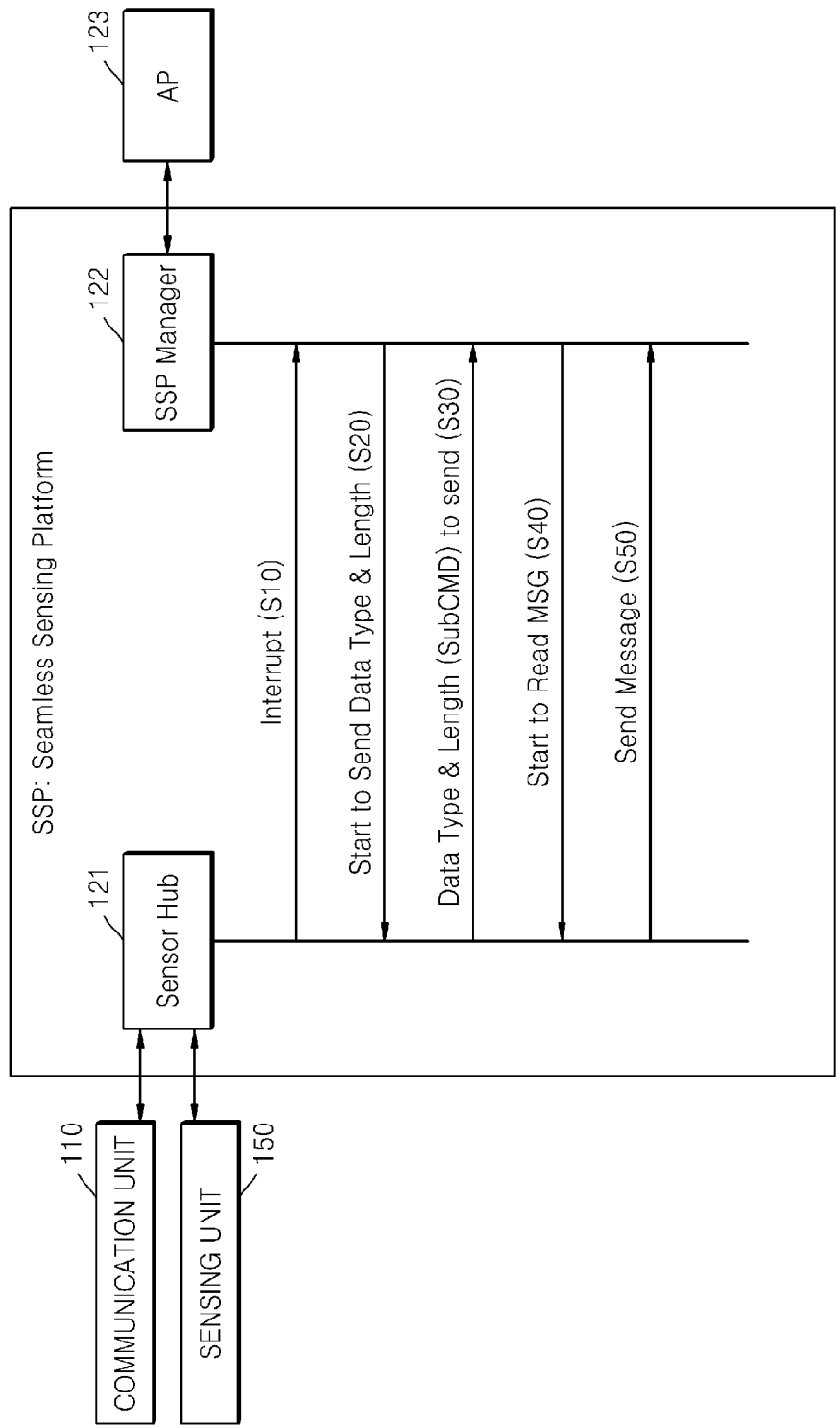
FIG. 21 shows a data communication protocol of a seamless sensing platform (SSP) related to an embodiment of the present invention according to invention principles.

FIG. 21 shows a data communication protocol of an SSP. The SSP (Seamless Sensing Platform) may include the sensor hub 121 and an SSP manager 122. The sensing unit 150 or the communication unit 110 may be connected to the sensor hub 121, and the SSP manager 122 may be included in a framework of the AP 123.

The sensor hub 121 may receive, via the communication unit 110, speaker's voice information that is broadcast by the second device 200. Also, the sensor hub 121 may receive, via the communication unit 110, communication connection information of the second device 200 and control information that is extracted from the speaker's voice information. When an event occurs to wake up the AP 123 from a sleep mode (e.g., when the received speaker's voice information matches pre-set reference voice information), the sensor hub 121 may transmit an interrupt signal to the SSP manager 122 so as to notify the existence of data to be transmitted (S10).

The SSP manager 122 may transmit, to the sensor hub 121, a signal that requests a type and length of the data to be transmitted by the sensor hub 121 (S20). The sensor hub 121 may transmit, to the SSP manager 122, content regarding the type and length of the data to be transmitted (S30). The SSP manager 122 may transmit a receiving ready message (Start to Read MSG) to the sensor hub 121 (S40). When the sensor hub 121 receives the Start to Read MSG, the sensor hub 121 may process state information of the first device 100, the speaker's voice information, the communication connection information of the second device 200, for example into a pre-agreed packet and may transmit the packet to the SSP manager 122 (S50). In this case, the AP 123 in the sleep mode wakes up.

Figure 22:
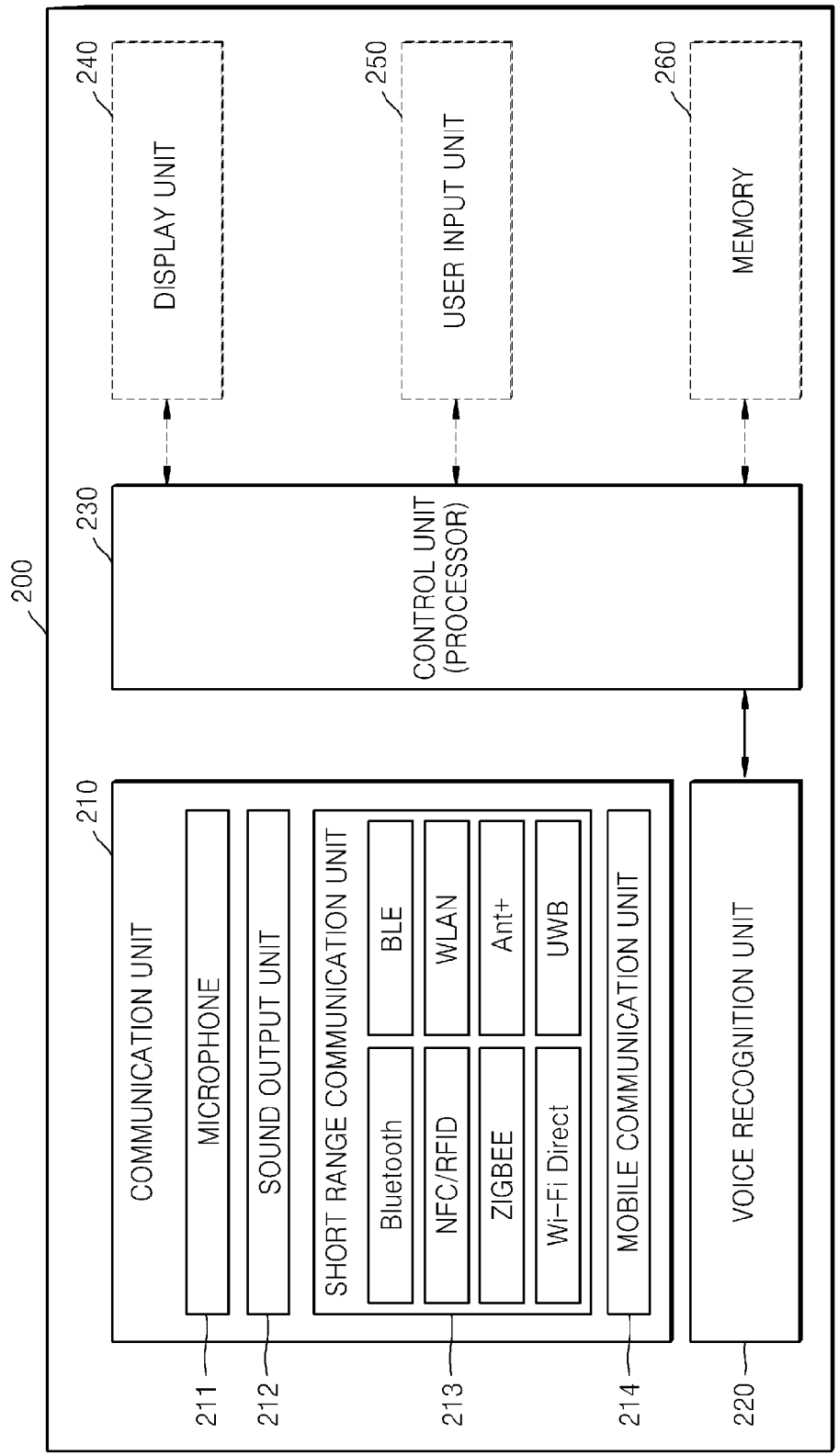
FIG. 22 shows a structure of the second device, according to invention principles.

FIG. 22 is a block diagram illustrating a structure of the second device 200. The second device 200 may include a communication unit 210, a voice recognition unit 220, and a control unit 230 (hereinafter, the processor 230). The second device 200 may be embodied by more or less elements than the above elements. For example, the second device 200 may further include a display unit 240, a user input unit 250, and a memory 260 in addition to the communication unit 210, the voice recognition unit 220, and the control unit 230. The communication unit 210 may include one or more elements allowing communication between the first device 100 and the second device 200 or between the second device 200 and a server. For example, the communication unit 210 may include a microphone 211, a sound output unit 212, a short range communication unit 213, and a mobile communication unit 214.

The microphone 211 receives an external sound signal as an input and processes the received sound signal into electrical voice data. For example, the microphone 211 may receive a sound signal transmitted by the first device 100. The sound signal transmitted by the first device 100 may include, but is not limited to, ID information of the first device 100, state information of the first device 100, and information about a communication method supported by the first device 100. The microphone 211 may receive a speaker' voice as an input. The microphone 211 may transmit the processed sound data to the processor 230.

The sound output unit 212 outputs audio data received from the outside or stored in the memory 260. Also, the sound output unit 212 outputs a sound signal related to a function (e.g., a call signal receiving sound, a message receiving sound, for example) performed by the second device 200. The sound output unit 212 may include a speaker.

The sound output unit 212 may broadcast a sound signal in which speaker's voice information and communication connection information of the second device 200 are inserted. For example, the second device 200 may insert the speaker's voice information, the ID information of the second device 200, the capability information of the second device 200, the information about a communication method preferred by the second device 200, the state information of the second device 200, control information, for example in an inaudible range or an audible range of the sound signal, and may broadcast the sound signal to the outside via the sound output unit 212.

The short range communication unit 213 may include, but is not limited thereto, a Bluetooth communication unit, a BLE communication unit, an NFC/RFID unit, a Wi-Fi communication unit, a ZigBee communication unit, an IrDA communication unit, a WFD communication unit, a UWB communication unit, an Ant+ communication unit, for example. The short range communication unit 213 may broadcast the speaker's voice information, the communication connection information of the second device 200, and the control information via short range communication. Also, the short range communication unit 213 may scan an external device via short range communication.

The mobile communication unit 214 exchanges a wireless signal with at least one of a base station, an external terminal, and a server on a mobile communication network. The wireless signal may include different types of data according to communication of a sound call signal, a video call signal, or a text/multimedia message.

The communication unit 210 may receive a communication connection request from the first device 100, based on the communication connection information of the second device 200. The communication unit 210 may transmit a response message with respect to the communication connection request to the first device 100.

The communication unit 210 may receive content from the first device 100 via a communication link. The communication unit 210 may transmit content to the first device 100 via a communication link. Also, the communication unit 210 may receive position information of the first device 100 from the first device 100.

The voice recognition unit 220 may detect a recognition target period from a voice of a user, may remove a noise component from the recognition target period and may extract a voice feature from the recognition target period. The voice recognition unit 220 may compare the extracted voice feature with a voice database and may output an expression having the highest likelihood as a recognition result. When the voice recognition unit 220 recognizes a sentence, not a simple command expression, the voice recognition unit 220 may use a language model.

The voice recognition unit 220 may perform isolated word recognition, continuous speech recognition, continuous speech recognition, keyword recognition, for example.

Also, the voice recognition unit 220 may perform speaker independent recognition and speaker dependent recognition.

The voice recognition unit 220 may extract the control information from the speaker's voice information input by a speaker. The control information may include at least one of a control command to receive content, a control command to transmit content, a control command to transmit position information, a control command to synchronize a plurality of pieces of data, a control command to switch a mode, and a control command to perform screen-mirroring.

The voice recognition unit 220 may be embodied as hardware or software or may be embodied as combination of hardware and software.

The processor 230 controls operations by the second device 200. For example, the processor 230 executes programs stored in the memory 260 so as to control the communication unit 210, the voice recognition unit 220, the display unit 240, the user input unit 250, the memory 260, for example.

The processor 230 may control the communication unit 210 to establish a communication link with the first device 100. The processor 230 may perform a function corresponding to the control information that is extracted from the speaker's voice information, via the communication link. For example, the processor 230 may transmit content, which is displayed on a screen when the speaker's voice information is obtained, to the first device 100 via the communication link.

The display unit 240 displays and outputs information processed by the second device 200. For example, the display unit 240 may display information about a recognition result of a speaker's voice, content, state information about connection with the first device 100, for example.

When the display unit 240 and a touch pad form a touch screen in a layer structure, the display unit 240 may be used as an input device in addition to an output device. The display unit 240 may include, but is not limited to, at least one of a liquid crystal display, a thin film transistor-liquid crystal display, an organic light-emitting diode display, a flexible display, a 3D display, and an electrophoretic display.

The user input unit 250 is a unit via which a user inputs data to control the second device 200.

When the user input unit 250 includes a touch pad, the user input unit 250 may detect a user's touch gesture.

The memory 260 may store a program for processing and controlling the processor 230 or input/output data (e.g., the ID information, the capability information, the information about a preferred communication method, the state information). The memory 260 may include a storage medium of at least one type of a flash memory, a hard disk, a multimedia card micro, a card type memory such as an SD or XD card memory, RAM, SRAM, ROM, EEPROM, PROM, a magnetic memory, a magnetic disc, and an optical disc.

As described above, according to the one or more of the above embodiments of the present invention, a user may easily perform pairing for a data exchange with a first device of the user by inputting a voice command to a device of another user or a second device of the user. Also, according to the one or more of the above embodiments of the present invention, a process in which the user selects a device and a process in which an acceptance with respect to device pairing is received from another user may be performed via one raw voice input, so that a total number of user inputs may be decreased.

One or more embodiments of the present invention may also be embodied as programmed commands to be executed in different computer means, and may be recorded to a computer-readable recording medium. The computer-readable recording medium may include one or more of the programmed commands, data files, data structures, for example. The programmed commands recorded to the computer-readable recording medium may be configured for one or more embodiments of the present invention or may be well known to one of ordinary skill in the art. Examples of the computer-readable recording medium include magnetic media including hard disks, magnetic tapes, and floppy disks, optical media including CD-ROMs and DVDs, magneto-optical media including optical disks, and a hardware apparatus designed to store and execute the programmed commands in ROM, RAM, a flash memory, and the like. Examples of the programmed commands include not only machine codes generated by a compiler but also include great codes to be executed in a computer by using an interpreter. The hardware apparatus may be configured to function as one or more software modules so as to perform operations of one or more embodiments of the present invention, or vice versa.

While one or more embodiments of the present invention have been described with reference to the figures, it will be understood by those of ordinary skill in the art that different changes in form and details may be made therein without departing from the spirit and scope of the present invention as defined by the following claims.

The above-described embodiments can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. The functions and process steps herein may be performed automatically or wholly or partially in response to user command. An activity (including a step) performed automatically is performed in response to executable instruction or device operation without user direct initiation of the activity. No claim element herein is to be construed under the provisions of 35 U.S.C. 112, sixth paragraph, unless the element is expressly recited using the phrase "means for."

What is claimed is:

1. A method of communicating between first and second electronic devices, comprising:
receiving, by a communication unit, audio information output by the second electronic device including voice representative information acquired by the second electronic device, and connection information indicating a particular one of a plurality of a short range communication types to be used in establishing a communication link with the second electronic device;
comparing by the first electronic device, the voice representative information with predetermined reference voice representative information to detect whether identifying information included in the voice representative information matches an identifier of the first electronic device; and
in response to detecting that the identifying information matches the identifier of the first electronic device, establishing a radio frequency communication link with the second electronic device that output the audio information, using the particular one of the plurality of a short range communication types indicated by the voice representative information.

2. The method of claim 1, wherein the communication unit comprises a microphone of the first electronic device.

3. The method of claim 2, wherein the voice representative information and the connection information of the second electronic device are inserted into at least one of an inaudible range and an audible range of the audio information and are broadcast by the second electronic device.

4. The method of claim 1, wherein the receiving comprises receiving the voice representative information and the connection information of the second electronic device via at least one of, short range communication and mobile communication.

5. The method of claim 1, wherein the voice representative information comprises at least one of identification (ID) information of the first electronic device, control information for controlling the first electronic device, and control information for controlling the first electronic device and the second electronic device.

6. The method of claim 1, wherein the receiving of the voice representative information comprises receiving at least one of a data representing raw voice representative information and voice feature information that is extracted from the raw voice representative information.

7. The method of claim 1, wherein the comparing comprises determining whether a similarity between the voice representative information and the reference voice representative information is equal to or greater than a predetermined value.

8. The method of claim 7, wherein, when the similarity is equal to or greater than the predetermined value, the establishing comprises establishing the communication link with the second electronic device, based on the connection information of the second electronic device.

9. The method of claim 7, further comprising, when the similarity is less than the predetermined value, broadcasting the voice representative information received from the second electronic device.

10. The method of claim 1, wherein the connection information of the second electronic device further comprises at least one of: capability information of the second electronic device, state information of the second electronic device, and service identification information.

11. The method of claim 10, wherein when the connection information includes the identifying information, and the service identification information indicates searching for a terminal, the method further comprises:
when the identifying information fails to match the identifier of the first electronic device, outputting the audio information by a speaker.

12. The method of claim 1, wherein the establishing comprises:

transmitting a connection request to the second electronic device; and receiving an acceptance message in response to the connection request.

13. The method of claim 1, further comprising:

receiving, from the second electronic device, control information that is extracted from the voice representative information; and performing a function in response to the control information.

14. The method of claim 13, wherein the control information comprises at least one of a control command to acquire content, a control command to transmit content, a control command to transmit position information, a control command to synchronize a plurality of pieces of data, a control command to switch a mode, and a control command to perform screen-mirroring.

15. The method of claim 1, further comprising, switching a screen lock mode of the first electronic device to a screen unlock mode in response to the comparison.

16. A non-transitory computer-readable recording medium having recorded thereon a program for executing the method of claim 1, by using a computer.

17. The method of claim 1, wherein:

if the particular one of the plurality of the short range communication types received by the first electronic device from the second electronic device is Near Field Communication (NFC), establishing the radio frequency communication link comprises establishing an NFC communication link with the second electronic device;

if the particular one of the plurality of the short range communication types received by the first electronic device from the second electronic device is Wi-Fi Direct (WFD), establishing the radio frequency communication link comprises establishing a WFD communication link with the second electronic device; and if the particular one of the plurality of the short range communication types received by the first electronic device from the second electronic device is Bluetooth, establishing the radio frequency communication link comprises establishing Bluetooth communication link with the second electronic device.

18. A method of communicating between first and second electronic devices, comprising:

acquiring, by the second electronic device, voice representative information;

broadcasting, by the second electronic device, the voice representative information and connection information of the second electronic device indicating characteristics of communication to be used in establishing a communication link;

receiving, by the second electronic device, a communication connection request from the first electronic device that receives the broadcast voice representative information and the connection information, the first electronic device comparing the voice representative information with predetermined reference voice representative information to detect whether identifying information included in the voice representative information matches an identifier of the first electronic device;

establishing, by the second electronic device and the first electronic device, a radio frequency communication link between the first electronic device and the second electronic device, in response to the connection request and utilizing the characteristics of communication, the first electronic device establishing the radio frequency communication link in response to detecting that the identifying information matches the identifier of the first electronic device; and transmitting, by the second electronic device, content displayed on the second electronic device to the first electronic device using the radio frequency communication link.

19. The method of claim 18, wherein the broadcasting comprises periodically broadcasting a sound signal comprising the voice representative information and the connection information of the second electronic device.

20. The method of claim 19, wherein the broadcasting comprises broadcasting the sound signal by inserting the voice representative information and the connection information of the second electronic device into at least one of an inaudible range and an audible range of the sound signal.

21. The method of claim 18, wherein the broadcasting comprises broadcasting the voice representative information and the connection information of the second electronic device via at least one of short range communication and mobile communication.

22. The method of claim 18, wherein the acquiring comprises:

receiving raw voice representative information via a microphone of the second electronic device; and analyzing the raw voice representative information and extracting voice feature information from the raw voice representative information.

23. The method of claim 18, wherein the broadcasting comprises broadcasting at least one of raw voice representative information and voice feature information extracted from the raw voice.

24. The method of claim 18, wherein the receiving comprises receiving the connection request from the first electronic device in response to a result of comparing, by the first electronic device, the voice representative information with reference voice representative information that is stored in the first electronic device.

25. The method of claim 18, further comprising:

extracting control information from the voice representative information; and transmitting the control information to the first electronic device.

26. The method of claim 25, further comprising performing a function in response to the control information via the communication link.

27. The method of claim 26, wherein the performing of the function comprises transmitting content to the first electronic device via the communication link, wherein the content is displayed on a screen of the second electronic device when the voice representative information is obtained.

28. A first electronic device that communicates with a second electronic device, the first electronic device comprising:

a communication unit receiving audio information output by the second electronic device including voice representative information obtained by the second electronic device, and connection information indicating a particular one of a plurality of a short range communication types to be used in establishing a communication link with the second electronic device; and a control unit for:

comparing the voice representative information with pre-stored reference voice representative information to detect whether identifying information included in the voice representative information matches an identifier of the first electronic device, and in response to detecting that the identifying information matches the identifier of the first electronic device, establishing a radio frequency communication link with the second electronic device that output the audio information, using the particular one of the short range communication types indicated by the voice representative information.

29. The first electronic device of claim 28, wherein the communication unit comprises a microphone for receiving a sound signal comprising the voice representative information and the connection information of the second electronic device.

30. The first electronic device of claim 29, wherein the control unit comprises a sensor hub connected with the microphone of the first electronic device, and an application processor,
 wherein the sensor hub compares the voice representative information with pre-stored reference voice representative information, and switches a sleep mode of the application processor to a wake-up mode in response to the comparison, and
 wherein the application processor in the wake-up mode controls the communication unit to establish a communication link with the second electronic device by using the connection information of the second electronic device.

31. The first electronic device of claim 28, wherein the communication unit comprises a short range communication unit for receiving the voice representative information and the connection information of the second electronic device via short range communication.

32. The first electronic device of claim 28, wherein, when a similarity between the voice representative information and the reference voice representative information is equal to or greater than a predetermined value, the control unit establishes the communication link with the second electronic device by using the connection information of the second electronic device.

33. The first electronic device of claim 28, wherein, when a similarity between the voice representative information and the reference voice representative information is less than a predetermined value, the control unit controls the communication unit to broadcast the voice representative information received from the second electronic device.

34. The first electronic device of claim 28, wherein the communication unit receives, from the second electronic device, control information that is extracted from the voice representative information, and
 wherein the control unit performs a function that corresponds to the control information.

35. The first electronic device of claim 28, wherein when the connection information further comprises identification information indicating a terminal, and service identification information, the control unit is further for:
 when the identifying information fails to match the identifier of the first electronic device, outputting the audio information by a speaker.

36. A second electronic device for communication with a first electronic device, the second electronic device comprising:
 a microphone;
 a display;
 a communication unit
 at least one processor; and memory storing programming instructions executable by the at least one processor to cause the second electronic device to:
 receive, by the microphone, raw voice representative information,
 obtain voice representative information by analyzing the raw voice representative information,
 broadcast, by the communication unit, the voice representative information and connection information indicating characteristics of communication for establishing a communication link with the second electronic device,
 receive, by the communication unit, a connection request from the first electronic device that receives the broadcast voice representative information and the connection information,
  the first electronic device comparing the voice representative information with with predetermined reference voice representative information to detect whether identifying information included in the voice representative information matches an identifier of the first electronic device;
 establish a radio frequency communication link with the first electronic device, in response to receiving the connection request, utilizing the characteristics of communication,
  the first electronic device establishing the radio frequency communication link in response to detecting that the identifying information matches the identifier of the first electronic device; and
 transmits to the first electronic device content displayed on the display using the radio frequency communication link.

37. A method of communicating between first and second electronic devices, comprising:
 receiving, by a communication unit, audio information output by the second electronic device including voice representative information acquired by the second electronic device, and connection information indicating a particular one of a plurality of a short range communication types to be used in establishing a communication link with the second electronic device;
 comparing by the first electronic device, the voice representative information with predetermined reference voice representative information; and
 in response to the comparison, establishing a radio frequency communication link with the second electronic device outputting the audio information, using the particular one of the plurality of a short range communication types indicated by the voice representative information,
 wherein the connection information of the second electronic device further comprises at least one of: identifying information indicating a terminal, capability information of the second electronic device, state information of the second electronic device, and service identification information, and
 wherein when the connection information includes the identifying information, and the service identification information indicates searching for a terminal, the method further comprises:
  detecting whether the identifying information matches an identifier of the first electronic device,
  when the identifying information fails to match the identifier of the first electronic device, outputting the audio information by a speaker, and when the identifying information matches the identifier of the first electronic device, establishing the radio frequency communication link with the second electronic device.

* * * * *

UNITED STATES PATENT AND TRADEMARK OFFICE
CERTIFICATE OF CORRECTION

PATENT NO.         : 10,228,903 B2
APPLICATION NO.    : 14/320907
DATED              : March 12, 2019
INVENTOR(S)        : Hyuk Kang et al.

Page 1 of 1

It is certified that error appears in the above-identified patent and that said Letters Patent is hereby corrected as shown below:

In the Claims

Column 42, Claim 36, Line 31 should read as follows:
--...transmit to the first electronic device content displayed...--

Signed and Sealed this
Sixteenth Day of April, 2019

Andrei Iancu
*Director of the United States Patent and Trademark Office*